United States Patent
Miyamoto et al.

(10) Patent No.: US 8,574,069 B2
(45) Date of Patent: *Nov. 5, 2013

(54) HAND-HELD GAME APPARATUS AND GAME PROGRAM

(71) Applicant: Nintendo Co., Ltd., Kyoto (JP)

(72) Inventors: Shigeru Miyamoto, Kyoto (JP); Katsuya Eguchi, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/658,600

(22) Filed: Oct. 23, 2012

(65) Prior Publication Data

US 2013/0072298 A1    Mar. 21, 2013

Related U.S. Application Data

(63) Continuation of application No. 10/837,650, filed on May 4, 2004, now Pat. No. 8,323,104.

(30) Foreign Application Priority Data

Dec. 10, 2003    (JP) ................. 2003-412582

(51) Int. Cl.
*A63F 9/24*    (2006.01)
*A63F 13/00*    (2006.01)
*G06F 17/00*    (2006.01)
*G06F 19/00*    (2011.01)

(52) U.S. Cl.
USPC .................. 463/30; 463/31; 463/36; 463/37; 463/38; 463/43; 463/44; 348/121; 703/11; 345/428; 345/473

(58) Field of Classification Search
USPC .............. 463/30, 31, 36–38, 43, 44; 348/121; 703/11; 345/428, 473
See application file for complete search history.

(56) References Cited

U.S. PATENT DOCUMENTS

| | | |
|---|---|---|
| 4,360,831 A | 11/1982 | Kellar |
| 4,445,144 A | 4/1984 | Giddings |
| 4,542,903 A | 9/1985 | Yokoi et al. |
| 4,600,200 A | 7/1986 | Oka et al. |

(Continued)

FOREIGN PATENT DOCUMENTS

| | | |
|---|---|---|
| JP | 58-116377 | 7/1983 |
| JP | 4-369027 | 12/1992 |

(Continued)

*Primary Examiner* — Omkar Deodhar
*Assistant Examiner* — Adetokunbo O Torimiro
(74) *Attorney, Agent, or Firm* — Nixon & Vanderhye P.C.

(57) ABSTRACT

A hand-held game apparatus and a game program are provided which allow a user to play a game while going back and forth between two kinds of maps, namely, a narrow-range map and a broad-range map game, and arbitrarily change the displayed state of at least one of the broad-range map and the narrow-range map by manipulating a touch panel which is mounted on a liquid crystal display section for displaying the broad-range map. If the player manipulates the touch panel to point to a coordinate position on the broad-range map, thus designating coordinates for a narrow-range map to display, an image of the narrow-range map, which is changed as desired, is displayed. If the player indicates a moving direction on the broad-range map, thus designating a scroll direction, the broad-range map is moved (scrolled).

26 Claims, 15 Drawing Sheets

(56) References Cited

U.S. PATENT DOCUMENTS

| | | |
|---|---|---|
| 4,631,691 A | 12/1986 | Pica |
| 4,646,075 A | 2/1987 | Andrews et al. |
| 4,692,756 A | 9/1987 | Clark |
| 4,727,365 A | 2/1988 | Bunker et al. |
| 5,276,785 A | 1/1994 | Mackinlay et al. |
| 5,359,703 A | 10/1994 | Robertson et al. |
| 5,414,444 A | 5/1995 | Britz |
| 5,422,989 A | 6/1995 | Bell et al. |
| 5,560,614 A | 10/1996 | Ueda et al. |
| 5,608,850 A | 3/1997 | Robertson |
| 5,689,628 A | 11/1997 | Robertson |
| 5,808,613 A | 9/1998 | Marrin et al. |
| 5,949,643 A | 9/1999 | Batio |
| 6,081,207 A | 6/2000 | Batio |
| 6,252,602 B1 * | 6/2001 | Matsuda et al. ............ 345/589 |
| 6,346,938 B1 | 2/2002 | Chan et al. |
| 6,540,614 B1 | 4/2003 | Nishino et al. |
| 6,667,877 B2 | 12/2003 | Duquette |
| 2002/0111216 A1 | 8/2002 | Himoto et al. |

FOREIGN PATENT DOCUMENTS

| | | |
|---|---|---|
| JP | 6-285259 | 10/1994 |
| JP | 7-294892 | 11/1995 |
| JP | 07294892 A  * | 11/1995 |
| JP | 2002-325963 | 11/2002 |

* cited by examiner

HAND-HELD GAME APPARATUS AND GAME PROGRAM

CROSS-REFERENCE TO RELATED APPLICATIONS

This application is a continuation of U.S. application Ser. No. 10/837,650 filed May 4, 2004, now U.S. Pat. No. 8,323,104 issued Dec. 4, 2012, which claims priority from Japanese Patent Application No. 2003-412582 filed Dec. 10, 2003. The disclosures of the prior applications are incorporated herein in their entirety by reference.

BACKGROUND OF THE INVENTION

1. Field of the Invention

The present invention relates to a hand-held game apparatus and a game program, and more particularly to a hand-held game apparatus including liquid crystal display sections embodying two screens, for example, with a touch panel being provided on at least one of the screens, such that two kinds of maps are displayed on the two screens for allowing a user to enjoy a unique game play; and a game program for use therewith.

2. Description of the Background Art

The following conventional techniques are known: Japanese Patent Laid-Open Publication No. H4-369027 (hereinafter "Conventional Technique 1") and Japanese Patent Laid-Open Publication No. H7-294892 (hereinafter "Conventional Technique 2"), each disclosing a mobile information terminal employing a touch panel; Japanese Patent Laid-Open Publication No. 58-116377 (hereinafter "Conventional Technique 3") disclosing a hand-held game apparatus incorporating two screens; Japanese Patent Laid-Open Publication No. 2002-325963 (hereinafter "Conventional Technique 4") disclosing a game system employing two screens; and Japanese Patent Laid-Open Publication No. H6-285259 (hereinafter "Conventional Technique 5") disclosing a controller for a video game machine employing a touch panel.

In Conventional Technique 1 and Conventional Technique 2, two (upper and lower) screens are provided, with a touch panel being provided on one of the screens for displaying an operational input screen. Conventional Technique 1 and Conventional Technique 2 may be suitable for the inputting of text or still image information. However, when it comes to applications dealing with moving pictures (e.g., a video game), there is no disclosure concerning what sort of operational input screen will be displayed and what sort of image is to be displayed in response to an operational input. Thus, from Conventional Technique 1 and Conventional Technique 2, it is not known what sort of usage is possible in the context of a video game (e.g., what sort of displayed content is provided by the software).

Conventional Technique 3 is directed to a hand-held game machine provided with two (upper and lower) screens, the upper screen displaying a stationary image of a two-storied building (showing the outer look of both the first and second floors), and the lower screen showing the inside of the first floor in a stationary manner, against which characters and falling movements of oil are displayed in segments. However, since the background images displayed on the upper and lower screens are stationary, and the moving characters and oil drops are only displayed in segments, Conventional Technique 3 is best suited to displaying images with simple and little motion, as opposed to a map (or an imaginary game world) of a large game space which would be required for popular role playing games (RPGs), simulation RPGs (SRPGs), action games, and shooting games.

Conventional Technique 4 is directed to a game system where a plurality of hand-held game machines are connected to a single video game machine. A shared map which is common to a plurality of players is displayed on a screen that is displayed by the video game machine on a household television set, while a dedicated image is displayed on the screen of a hand-held game machine of each player, the latter image being confined to a narrow field as viewed by the player. However, Conventional Technique 4 requires a single household television set and a plurality of hand-held game machines, thus resulting in a complicated and expensive system configuration. While Conventional Technique 4 is suitable for displaying a simple map image such as that of a maze puzzle game, this technique is not suitable for RPGs, SRPGs, action games because such games would generally require complex and broad maps. Moreover, the picture to be displayed on each hand-held game machine is limited to a field of view as determined by the program; that is, the user is not allowed to select the displayed area. Thus, the game operation may become monotonous, which may lead to boredom of the user.

In Conventional Technique 5, a touch panel and a liquid crystal display device are provided for a game controller, which is to be connected to a video game machine. Operable icons, such as operation switches and the like, are displayed on the liquid crystal display device of the liquid crystal controller (game controller), such that an operation signal which is input by the user touching on the touch panel causes a displayed picture on the TV screen to change. Conventional Technique 5 touches on the problem of displaying two kinds of screens, such as: displaying a game picture of an airplane from a different point of view on the TV screen, while displaying an icon such as a control stick to be operated in a cockpit thereof on the liquid crystal display screen (as shown in its FIG. 3); displaying a game picture of an entire piano on the TV screen, while displaying icons such as keys of the keyboard of the piano to be played on the liquid crystal display screen (as shown in its FIG. 4); displaying an entire map on the TV screen, while displaying an enlarged image including tanks or airplanes which are controllable by the player on the liquid crystal display screen (as shown in its FIG. 7). However, according to Conventional Technique 5, the game screen is nonetheless displayed on a single TV screen, and no specific means for solving the above problem is particularly disclosed. Moreover, the display image on the TV screen and the display image on the liquid crystal display screen both depend on the program, which means that the player cannot freely change the displayed area or change the range to be enlarged. Thus, the displayed images may become monotonous, and the user may become bored. Furthermore, since the touch panel and the liquid crystal display device are provided on the game controller, the player will have to look down to watch the operative icons or look up to gaze straight ahead at the game picture on the TV screen, and therefore is likely to feel ocular fatigue. Moreover, in order to go back and forth between the TV screen and the liquid crystal display screen which is provided on the game controller, a slight change in the viewing angle or viewing direction would not suffice. Such difficulties in looking at the displays leads to poor controllability.

SUMMARY OF THE INVENTION

Thus, an object of the present invention is provide a novel hand-held game apparatus which allows a user to play a game while going back and forth between two kinds of maps, namely, a narrow-range map and a broad-range map game, and arbitrarily change the displayed state of at least one of the broad-range map and the narrow-range map by manipulating a touch panel which is mounted correspondingly to a liquid crystal display section for displaying the broad-range map; and a game program for use therewith.

Another object of the present invention is provide a hand-held game apparatus which allows a user to play a game by using two kinds of maps, namely, a narrow-range map and a broad-range map game, such that the player can arbitrarily change the displayed state (e.g., a moving direction and a moving range) of the broad-range map by manipulating a touch panel which is mounted correspondingly to a liquid crystal display section for displaying the broad-range map; and a game program for use therewith.

Still another object of the present invention is provide a hand-held game apparatus which allows a user to play a game by using two kinds of maps, namely, a narrow-range map and a broad-range map game, such that the player can arbitrarily change the displayed state (e.g., the displayed area or a coordinate position) of the narrow-range map by manipulating a touch panel which is mounted correspondingly to a liquid crystal display section for displaying the broad-range map; and a game program for use therewith.

Yet another object of the present invention is provide a hand-held game apparatus which, by using a narrow-range map and a broad-range map game, allows a user to play a game which is novel and interesting and which requires strategic thoughts, as compared to games which can be played on conventional hand-held game machines; and a game program for use therewith.

According to a first aspect of the invention, there is provided a hand-held game apparatus comprising a first liquid crystal display section, a second liquid crystal display section, a housing, a touch panel, manipulation detection means, map image data generation means, object image data generation means, map image data change imparting means, and display control means.

The first liquid crystal display section displays a first game picture including a map for a game. The a second liquid crystal display section, located near the first liquid crystal display section, displays a second game picture including a map covering a broader range than does the map displayed on the first liquid crystal display section. The housing accommodates the first liquid crystal display section and the second liquid crystal display section. The touch panel, mounted at least correspondingly to the second liquid crystal display section, outputs coordinate data when the touch panel is manipulated, the coordinate data indicating a manipulated position on a display surface of the second liquid crystal display section. The manipulation detection means detects at least one of a designated coordinate position and a designated moving direction based on the coordinate data output from the touch panel. Based on a game program, the map image data generation means generates broad-range map image data for causing the second liquid crystal display section to display a broad-range map image, and narrow-range map image data for causing the first liquid crystal display section to display a narrow-range map image. The object image data generation means generates object image data for causing at least the first liquid crystal display section to display an object belonging to the game. In accordance with at least one of the designated coordinate position and the designated moving direction as detected by the manipulation detection means on the second liquid crystal display section, the map image data change imparting means changes at least one of the narrow-range map image data and the broad-range map image data generated by the map image generation means. The display control means controls the first liquid crystal display section to display as the first game picture the narrow-range map image data generated by the map image data generation means together with the object image data generated by the object image data generation means being superposed thereon, controls the second liquid crystal display section to display as the second game picture the broad-range map image data generated by the map image data generation means, and further controls one of the first or second liquid crystal display section to display at least one of the broad-range or narrow-range map image data as changed by the map image data change imparting means.

Thus, a hand-held game apparatus can be provided which allows the player to change the displayed state of at least one of the broad-range map and the narrow-range map through the manipulation of the touch panel.

According to a second aspect, the manipulation detection means detects the designated coordinate position based on the coordinate data output from the touch panel, and the map image data change imparting means changes, in accordance with the designated coordinate position as detected by the manipulation detection means on the broad-range map displayed by the second liquid crystal display section, the narrow-range map image data generated by the map image generation means so as to represent a narrow-range map image around the designated coordinate position.

Thus, the narrow-range map image can be changed so as to represent the neighborhood of a coordinate position designated on the broad-range map screen by means of the touch panel.

According to a third aspect, the manipulation detection means detects the designated moving direction based on the coordinate data output from the touch panel, and the map image data change imparting means changes, in accordance with the designated moving direction as detected by the manipulation detection means on the broad-range map displayed by the second liquid crystal display section, the broad-range map image data generated by the map image generation means so as to represent a broad-range map image having been moved in the designated moving direction.

Thus, the broad-range map image can be moved (scrolled) in a direction designated through the manipulation of the touch panel.

According to a fourth aspect, the manipulation detection means detects the designated coordinate position and the designated moving direction based on the coordinate data output from the touch panel. The map image data change imparting means is operable to: change, in accordance with the designated coordinate position as detected by the manipulation detection means on the broad-range map displayed by the second liquid crystal display section, the narrow-range map image data generated by the map image generation means so as to represent a narrow-range map image around the designated coordinate position, and change, in accordance with the designated moving direction as detected by the manipulation detection means on the broad-range map displayed by the second liquid crystal display section, the broad-range map image data generated by the map image generation means so as to represent a broad-range map image having been moved in the designated moving direction.

Thus, based on the manipulation of the touch panel, the displayed area of the narrow-range map image can be changed, and also the broad-area map image can be scrolled.

According to a fifth aspect, there is provided a hand-held game apparatus comprising a first liquid crystal display section, a second liquid crystal display section, a housing, a touch panel, manipulation detection means, first map image data generation means, second map image data generation means, object image data generation means, map image data change imparting means, and display control means, where the change in the map image according to the first aspect is a change in the narrow-range map image.

The first liquid crystal display section, the second liquid crystal display section, the housing, the touch panel, and the object image data generation means are constructed similarly to those in the hand-held game apparatus according to the first aspect. The map image data generation means comprises a first map image data generation means and a second map image data generation means. The manipulation detection means at least detects coordinate data of a designated coordinate position based on a manipulation of the touch panel. Based on a game program, the first map image data generation means generates narrow-range map image data for causing the first liquid crystal display section to display a narrow-range map image. Based on the game program, the second map image data generation means generates broad-range map image data for causing the second liquid crystal display section to display a broad-range map image. In response to an instruction of a designated coordinate position for enlarged display as detected by the manipulation detection means on the broad-range map image, the map image data change imparting means at least changes the narrow-range map image data so as to represent a narrow-range map image around the designated coordinate position. The display control means controls the first liquid crystal display section to display as the first game picture the narrow-range map image data generated by the first map image data generation means or changed by the map image change imparting means together with the object image data generated by the object image data generation means being superposed thereon, and controlling the second liquid crystal display section to display as the second game picture the broad-range map image data generated by the second map image data generation means.

According to a sixth aspect, while the broad-range map image is being displayed by the second liquid crystal display section, the manipulation detection means generates data designating a displayed area for the narrow-range map image which is centered around the designated coordinate position, based on a predetermined click operation on the touch panel, and the map image data change imparting means changes, in accordance with the data designating the displayed area as detected by the manipulation detection means, the narrow-range map image data so as to represent a narrow-range map image around the designated coordinate position.

According to a seventh aspect, the manipulation detection means detects the designated moving direction based on a manipulation of the touch panel, and the map image data change imparting means changes, in response to an instruction of a moving direction as detected by the manipulation detection means, the broad-range map image data generated by the second map image generation means so as to represent a broad-range map image having been moved in the designated moving direction.

According to an eighth aspect, the manipulation detection means detects the instruction of the moving direction based on an amount of change in the coordinate data as detected over time, and the map image data change imparting means comprises scroll display control means for gradually changing, in accordance with the instruction of the moving direction as detected by the manipulation detection means, the broad-range map image data generated by the second map image data generation means so as to represent a broad-range map image which is gradually scrolled in the designated moving direction.

According to a ninth aspect, there is provided a hand-held game apparatus comprising a first liquid crystal display section, a second liquid crystal display section, a housing, a touch panel, manipulation detection means, first map image data generation means, second map image data generation means, object image data generation means, map image data change imparting means, and display control means, where the change in the map image according to the first aspect is a change in the broad-range map image. The first liquid crystal display section, the second liquid crystal display section, the housing, the touch panel, and the object image data generation means are constructed similarly to those in the hand-held game apparatus according to the first aspect. The map image data generation means comprises a first map image data generation means and a second map image data generation means. The manipulation detection means at least detects a moving direction in accordance with a change in a designated coordinate position, based on the coordinate data output from the touch panel. Based on a game program, the first map image data generation means generates narrow-range map image data for causing the first liquid crystal display section to display a narrow-range map image. Based on the game program, the second map image data generation means generates broad-range map image data for causing the second liquid crystal display section to display a broad-range map image. In response to an instruction of a moving direction as detected by the manipulation detection means on the broad-range map image, the map image data change imparting means at least changes the narrow-range map image data generated by the second map image data generation means so as to represent a broad-range map image having been moved in the designated moving direction. The display control means controls the first liquid crystal display section to display as the first game picture the narrow-range map image data generated by the first map image data generation means together with the object image data generated by the object image data generation means being superposed thereon, and controlling the second liquid crystal display section to display as the second game picture the broad-range map image data generated by the second map image data generation means or changed by the map image change imparting means.

According to a tenth aspect, the manipulation detection means further detects a designated coordinate position based on a manipulation of the touch panel, the map image data change imparting means changes, in response to the manipulation detection means detecting the coordinate position, the narrow-range map image data generated by the first map image data generation means so as to represent an enlarged narrow-range map image around the designated coordinate position, and the display control means controls the first liquid crystal display section to display as the first game picture the narrow-range map image data having been moved by the map image data change imparting means together with the object image data generated by the object image data generation means being superposed thereon.

According to an eleventh aspect, the object image data generation means generates large-size player object image data for causing the first liquid crystal display section to display a large-size player object and small-size player object image data for causing the second liquid crystal display section to display a small-size player object, and the map image data change imparting means changes the narrow-range map image data generated by the map image generation means in accordance with the designated coordinate position as detected by the manipulation detection means on the broad-range map, and changes the broad-range map image data so as to represent a scrolled broad-range map image in accordance with the designated moving direction as detected by the manipulation detection means on the broad-range map. The display control means is operable to: control the first liquid crystal display section to display as the first game picture the narrow-range map image data having been changed by the map image data change imparting means together with the large-size player object image data generated by the object image data generation means being superposed thereon, and control the second liquid crystal display section to display as the second game picture the broad-range map image data having been changed by the map image data change imparting means together with the small-size player object image data generated by the object image data generation means being superposed thereon, thus causing the changed narrow-range map image and the changed broad-range map image to be displayed.

According to a twelfth aspect of the invention, there is provided a game program corresponding to the hand-held game apparatus of the first aspect, for use with a hand-held game apparatus comprising: a first liquid crystal display section for displaying a first game picture including a map for a game; a second liquid crystal display section, located near the first liquid crystal display section, for displaying a second game picture including a map covering a broader range than does the map displayed on the first liquid crystal display section; a housing for accommodating the first liquid crystal display section and the second liquid crystal display section; a touch panel, mounted at least correspondingly to the second liquid crystal display section, for outputting coordinate data when the touch panel is manipulated, the coordinate data indicating a manipulated position on a display surface of the second liquid crystal display section; and a computer. The game program causes the computer to execute: a manipulation detection step, a map image data generation step, an object image data generation step, a map image data change imparting step, and a display control step.

The manipulation detection step detects at least one of a designated coordinate position and a designated moving direction based on the coordinate data output from the touch panel. Based on a game program, the map image data generation step generates broad-range map image data for causing the second liquid crystal display section to display a broad-range map image, and narrow-range map image data for causing the first liquid crystal display section to display a narrow-range map image. The object image data generation step generates object image data for causing at least the first liquid crystal display section to display an object belonging to the game. In accordance with at least one of the designated coordinate position and the designated moving direction as detected by the manipulation detection step on the broad-range map, the map image data change imparting step changes at least one of the narrow-range map image data and the broad-range map image data generated by the map image generation step. The display control step controls the first liquid crystal display section to display as the first game picture the narrow-range map image data generated by the map image data generation step together with the object image data generated by the object image data generation step being superposed thereon, controls the second liquid crystal display section to display as the second game picture the broad-range map image data generated by the map image data generation step, and further controls one of the first or second liquid crystal display section to display at least one of the broad-range or narrow-range map image data as changed by the map image data change imparting step.

Thus, a game program can be provided which allows the player to change the displayed state of at least one of the broad-range map and the narrow-range map through the manipulation of the touch panel.

According to a thirteenth aspect, the map image data change imparting step changes, in accordance with the designated coordinate position as detected by the manipulation detection step on the broad-range map, the narrow-range map image data generated by the map image generation step so as to represent a narrow-range map image around the designated coordinate position.

According to a fourteenth aspect, the map image data change imparting step changes, in accordance with the designated moving direction as detected by the manipulation detection step on the broad-range map, the broad-range map image data generated by the map image generation step so as to represent a broad-range map image having been moved in the designated moving direction.

According to a fifteenth aspect, the map image data change imparting step comprises: changing, in accordance with the designated coordinate position as detected by the manipulation detection step on the broad-range map, the narrow-range map image data generated by the map image generation step so as to represent a narrow-range map image around the designated coordinate position, and changing, in accordance with the designated moving direction as detected by the manipulation detection step on the broad-range map, the broad-range map image data generated by the map image generation step so as to represent a broad-range map image having been moved in the designated moving direction.

According to a sixteenth aspect of the invention, there is provided a game program corresponding to the hand-held game apparatus of the fifth aspect, for use with a hand-held game apparatus comprising: a first liquid crystal display section for displaying a first game picture including a map for a game; a second liquid crystal display section, located near the first liquid crystal display section, for displaying a second game picture including a map covering a broader range than does the map displayed on the first liquid crystal display section; a housing for accommodating the first liquid crystal display section and the second liquid crystal display section in predetermined positions; a touch panel, mounted at least correspondingly to the second liquid crystal display section, for outputting coordinate data when the touch panel is manipulated, the coordinate data indicating a manipulated position on a display surface of the second liquid crystal display section; and a computer. The game program causes the computer to execute: a manipulation detection step, a first map image data generation step, a second map image data generation step, an object image data generation step, a map image data change imparting step, and a display control step. The manipulation detection step at least detects coordinate data of a designated coordinate position based on a manipulation of the touch panel. Based on a game program, the first map image data generation step generates narrow-range map image data for causing the first liquid crystal display section to display a narrow-range map image. Based on the game program, the second map image data generation step generates broad-range map image data for causing the second liquid crystal display section to display a broad-range map image. The object image data generation step generates object image data for causing at least the first liquid crystal display section to display an object belonging to the game. In response to an instruction of a designated coordinate position for enlarged display as detected by the manipulation detection step on the broad-range map image, the map image data change imparting step at least changes the narrow-range map image data so as to represent a narrow-range map image around the designated coordinate position. The display control step controls the first liquid crystal display section to display as the first game picture the narrow-range map image data generated by the first map image data generation step or changed by the map image change imparting step together with the object image data generated by the object image data generation step being superposed thereon, and controlling the second liquid crystal display section to display as the second game picture the broad-range map image data generated by the second map image data generation step.

According to a seventeenth aspect, while the broad-range map image is being displayed by the second liquid crystal display section, the manipulation detection step generates data designating a displayed area for the narrow-range map image which is centered around the designated coordinate position, based on a predetermined click operation on the touch panel, and the map image data change imparting step changes, in accordance with the data designating the displayed area as detected by the manipulation detection step, the narrow-range map image data so as to represent a narrow-range map image around the designated coordinate position.

According to an eighteenth aspect, the manipulation detection step detects the designated moving direction based on a manipulation of the touch panel, and the map image data change imparting step changes, in response to an instruction of a moving direction as detected by the manipulation detection step, the broad-range map image data generated by the second map image generation step so as to represent a broad-range map image having been moved in the designated moving direction.

According to a nineteenth aspect, the manipulation detection step detects the instruction of the moving direction based on an amount of change in the coordinate data as detected over time, and the map image data change imparting step comprises a scroll display control step of gradually changing, in accordance with the instruction of the moving direction as detected by the manipulation detection step, the broad-range map image data generated by the second map image data generation step so as to represent a broad-range map image which is gradually scrolled in the designated moving direction.

According to a twentieth aspect of the invention, there is provided a game program corresponding to the hand-held game apparatus of the twelfth aspect, for use with a hand-held game apparatus comprising: a first liquid crystal display section for displaying a first game picture including a map for a game; a second liquid crystal display section, located near the first liquid crystal display section, for displaying a second game picture including a map covering a broader range than does the map displayed on the first liquid crystal display section; a housing for accommodating the first liquid crystal display section and the second liquid crystal display section in predetermined positions; a touch panel, mounted at least correspondingly to the second liquid crystal display section, for outputting coordinate data when the touch panel is manipulated, the coordinate data indicating a manipulated position on a display surface of the second liquid crystal display section; and a computer. The game program causes the computer to execute: a manipulation detection step, a first map image data generation step, a second map image data generation step, an object image data generation step, a map image data change imparting step, and a display control step. The manipulation detection step at least detects a moving direction in accordance with a change in a designated coordinate position, based on the coordinate data output from the touch panel. Based on a game program, the first map image data generation step generates narrow-range map image data for causing the first liquid crystal display section to display a narrow-range map image. Based on the game program, the second map image data generation step generates broad-range map image data for causing the second liquid crystal display section to display a broad-range map image. The object image data generation step generates object image data for causing at least the first liquid crystal display section to display an object belonging to the game. In response to an instruction of a moving direction as detected by the manipulation detection step on the broad-range map image, the map image data change imparting step at least changes the narrow-range map image data generated by the second map image data generation step so as to represent a broad-range map image having been moved in the designated moving direction. The display control step controls the first liquid crystal display section to display as the first game picture the narrow-range map image data generated by the first map image data generation step together with the object image data generated by the object image data generation step being superposed thereon, and controls the second liquid crystal display section to display as the second game picture the broad-range map image data generated by the second map image data generation step or changed by the map image change imparting step.

Thus, according to the present invention, there is provided a novel hand-held game apparatus which allows a user to play a game while going back and forth between two kinds of maps, namely, a narrow-range map and a broad-range map game, and arbitrarily change the displayed state of at least one of the broad-range map and the narrow-range map by manipulating a touch panel which is mounted correspondingly to a liquid crystal display section for displaying the broad-range map; and a game program for use therewith.

Moreover, there is provided a unique advantage which allows a user to play a game by using two kinds of maps, namely, a narrow-range map and a broad-range map game, such that the player can arbitrarily change the displayed state (e.g., a moving direction and a moving range) of the broad-range map by manipulating a touch panel which is mounted correspondingly to a liquid crystal display section for displaying the broad-range map; and a game program for use therewith.

Moreover, the player can arbitrarily change the displayed state (e.g., the displayed area or a coordinate position) of the narrow-range map by manipulating a touch panel which is mounted correspondingly to a liquid crystal display section for displaying the broad-range map.

Furthermore, there is provided a hand-held game apparatus which, by using a narrow-range map and a broad-range map game, allows a user to play a game which is novel and interesting and which requires strategic thoughts, as compared to games which can be played on conventional hand-held game machines; and a game program for use therewith.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
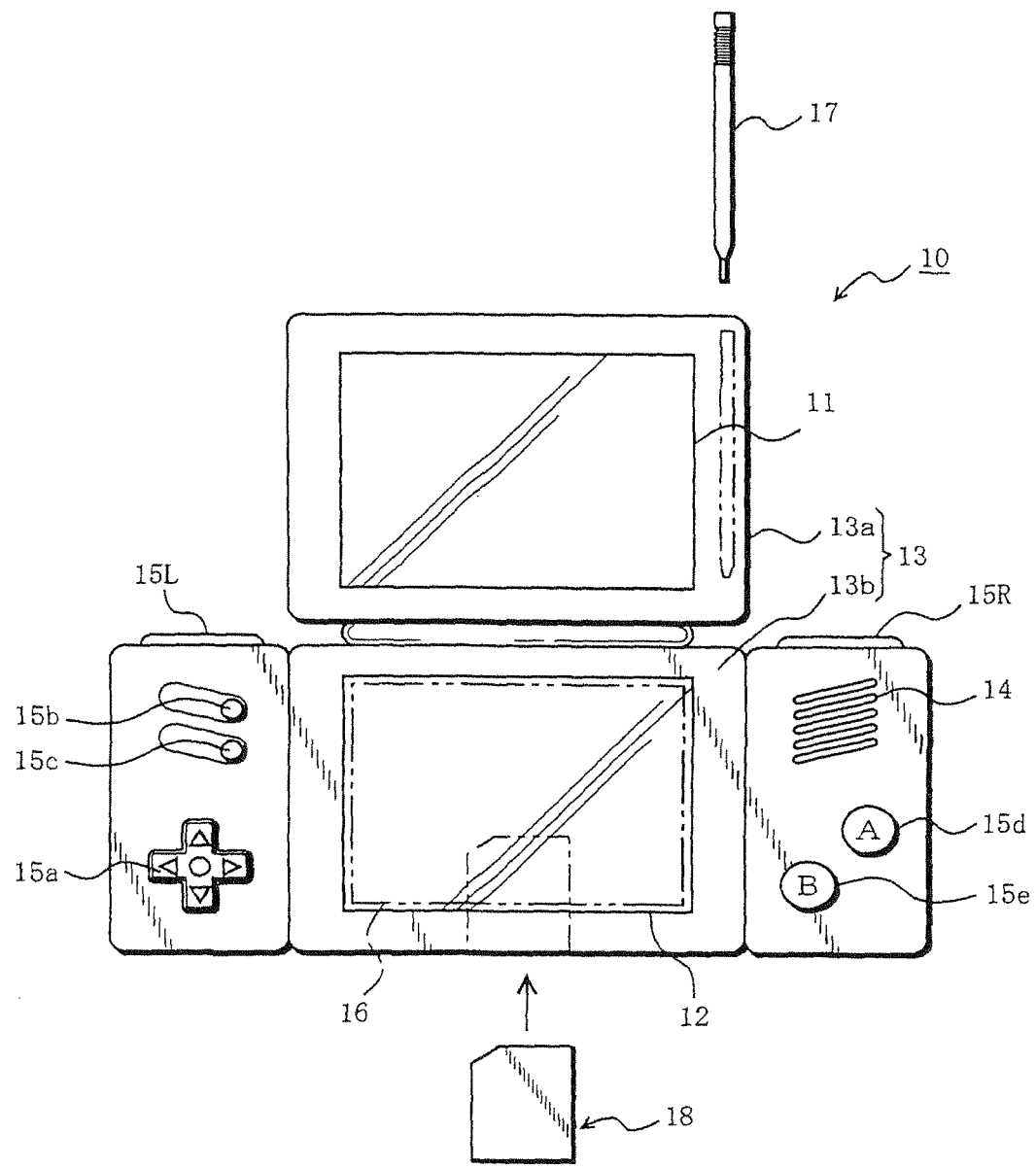
FIG. 1 is a view showing the outer look of a hand-held game apparatus according to an embodiment of the present invention.

FIG. 1 is a view showing the outer look of a hand-held game apparatus according to an embodiment of the present invention. As shown in FIG. 1, the hand-held game apparatus 10 according to the present embodiment is accommodated in a housing 13 for placing two liquid crystal display devices (LCDs) 11 and 12 in predetermined positions. Specifically, in the case where the first liquid crystal display device (hereinafter referred to as "LCD") 11 and the second LCD 12 are to be disposed one on top of the other, the housing 13 is composed of an upper housing 13a and a lower housing 13b, the upper housing 13a being supported by a portion of the upper side of the lower housing 13b so as to be pivotable. The upper housing 13a has a planar contour which is slightly larger than that of the first LCD 11. The upper housing 13a has an opening in one principal face thereof, through which a display surface of the LCD 11 is exposed. The lower housing 13b has a more elongated planar contour than that of the upper housing 13a (i.e., so as to have a longer lateral dimension). An opening for exposing the display surface of the LCD 12 is formed in a portion of the lower housing 13b which lies substantially in the center of the lower housing 13b along the lateral direction. An operation switch section 15 is provided on right and left wings of the lower housing 13b between which the LCD 12 is interposed. A sound hole 14b is formed in either wing of the lower housing 13b.

The operation switch section 15 includes: a direction switch 15a, a start switch 15b, and a select switch 15c, which are provided on a principal face of the left wing of the lower housing 13b (lying to the left of the LCD 12); and action switches 15d and 15e, which are provided on a principal face of the right wing of the lower housing 13b (lying to the right of the LCD 12). The direction switch 15a is used by a player for providing instructions of a direction in which to move a player object (or a player character) that can be controlled by the player, or instructions of a direction in which to move a cursor, for example. The action switches 15d and 15e are used for giving instructions of any action other than instructions of directions, e.g., "jump", "punch", or "use a weapon" in the case of an action game, or "get an item" or "select a weapon" or "select a command" in the case of a role playing game (RPG) or a simulation RPG. As necessary, more action switches may be added, and side switches 15L and 15R may be further provided on an upper portion (upper side face) of the area of the lower housing 13b in which the operation switches 15 are mounted.

A touch panel 16 is mounted on the upper principal face of the LCD 12. The touch panel 16 may be of any one of a resistive film type, an optical type (infrared type), or a capacitive coupling type. When a stick 17 (or a finger) is pressed against or moved or dragged on the upper principal face of the touch panel 16, the touch panel 16 detects the coordinate position of the stick 17 and outputs coordinate data. The touch panel 16 is to be used for indicating the following instructions on a map covering a relatively broad area (hereinafter referred to as the "broad-range map"), which is to be displayed on the screen of the LCD 12: changing specific coordinates around which to display a map covering a narrower area than that of the broad-range map (hereinafter referred to as the "narrow-range map"); or designating a moving direction or a scroll direction for the broad-range map itself. However, depending on the type of the game, the touch panel 16 may also be used for indicating any other type of input instructions (e.g., selection or manipulation of an icon which is displayed on the LCD 12, or an instruction to input coordinates).

As described above, the hand-held game apparatus 10 includes the LCDs 11 and 12, which define liquid crystal display sections embodying two screens, with the touch panel 16 being provided on the upper principal face of one of the LCDs (for example, the lower screen, i.e., the LCD 12). Thus, there exist two screens (LCDs 11 and 12) and two operation sections (15, 16). In this construction, the touch panel 16 is to be used for indicating different operation inputs (or input instructions) from those which can be indicated by using the operation switch section 15.

As necessary, a hole 14a for accommodating the stick 17 with which to manipulate the touch panel 16 is provided near a side face of the upper housing 13a. The hole 14a can hold the stick 17. In a portion of a side face of the lower housing 13b is provided a cartridge receptacle (not shown), into which a game cartridge 18 internalizing a memory for storing a game program (e.g., a ROM) is detachably inserted. A connector (not shown) lies inside the cartridge receptacle for providing electrical connection with the game cartridge 18. Furthermore, the lower housing 13b (or alternatively the upper housing 13a) accommodates an electronic circuit board (indicated as 30 in FIG. 8) on which various electronic components such as a CPU are mounted. Examples of information storage media for storing a game program are not limited to non-volatile semiconductor memories such as ROMs or flash memories, but may also be optical disk type recording media, such as CD-ROMs, DVDs, or the like.

Figure 2:
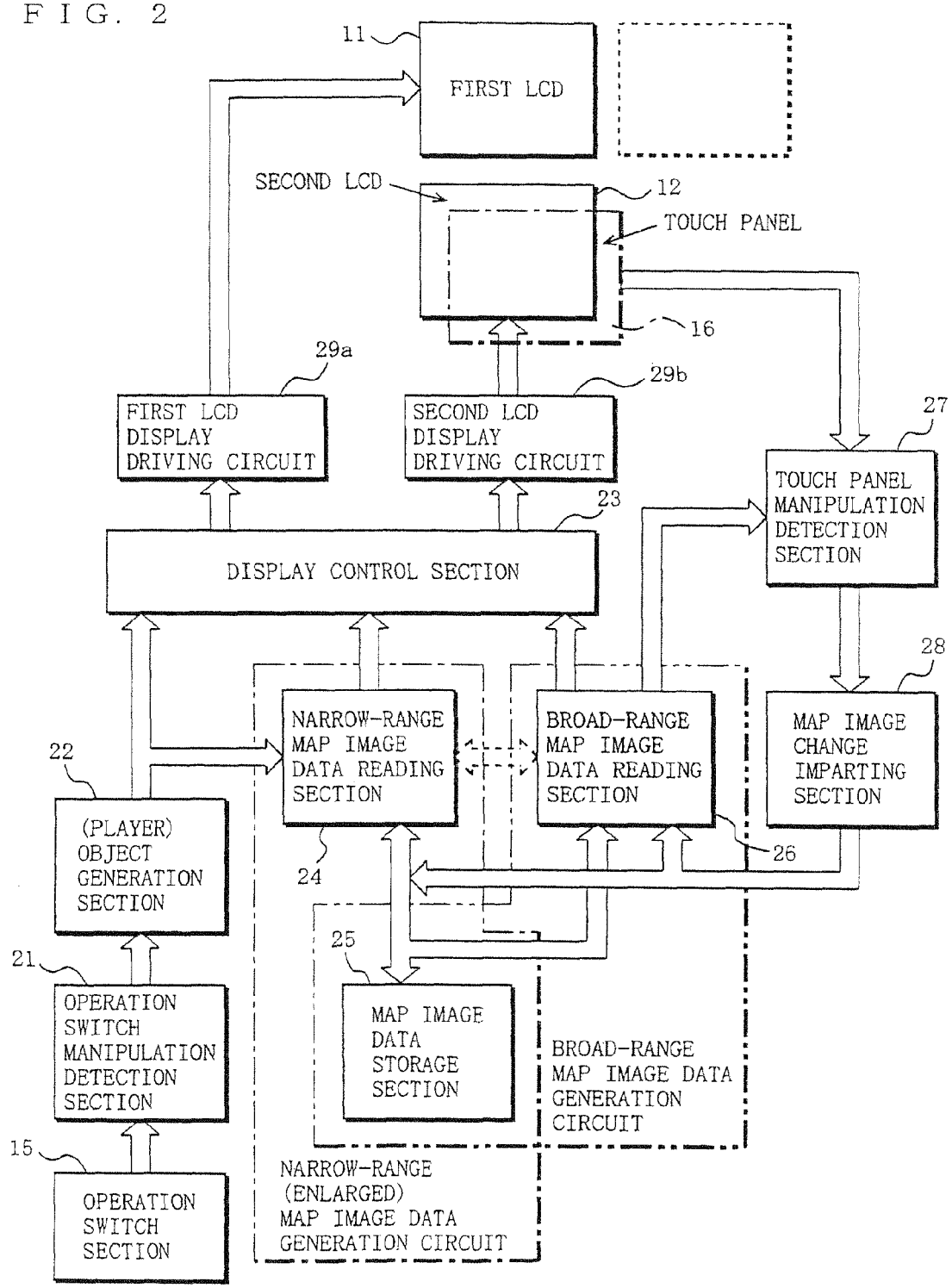
FIG. 2 is a principle block diagram (functional block diagram) illustrating the operation principle of a hand-held game apparatus according to an embodiment of the present invention.

FIG. 2 is a principle block diagram (functional block diagram) illustrating the operation principle of the hand-held game apparatus according to the present embodiment. In FIG. 2, if an operation signal which is input by manipulating the operation switch section 15 is input to an operation switch manipulation detection section 21, the manipulation detection section 21 detects which one(s) of the direction switch 15a, the switches 15b to 15e, 15L, and 15R in the operation switch section 15 has been manipulated and how the switch(es) has been manipulated, and passes data expressing this information (hereinafter referred to as "manipulation detection data") to an object image data generation section 22. The object image data generation section 22 includes: an object data storage section (not shown) for storing image data of a player object (or a player character) to be controlled by the player, as well as image data of moving objects, such as non-player objects (i.e., enemy objects or friend objects which cannot be controlled by the player); and an object generation control section (not shown) which reads image data of the player object and/or non-player objects stored in the object storage section. Based on a object control program and the manipulation detection data in the operation switch section 15, the object image data generation section 22 generates data representing a changed image of the player object, and as necessary, generates image data of non-player object based on the program, and passes such image data to a display control section 23. In order to allow the narrow-range map image serving as a background screen to change in response to the movements of the player object, the current coordinate data of the player object is passed to a narrow-range map image data reading section 24.

The narrow-range map image data reading section 24 reads the map image data stored in the map image data storage section 25, generates narrow-range map image data, and supplies the narrow-range map image data to the display control section 23. As used herein, a "map" represents a game area within a game space, e.g., a background, the inside of a room, or a basement, and may be referred to as a "stage" or a "world" in some games. The broad-range map image data reading section 26 reads the map image data stored in the map image data storage section 25, generates broad-range map image data, and supplies the broad-range map image data to the display control section 23. The map image data storage section 25 and the narrow-range map image data reading section 24 together constitute a narrow-range map image data generation section. The map image data storage section 25 and the broad-range map image data reading section 26 together constitute a broad-range map image data generation section. The narrow-range map image which is generated by the narrow-range map image data reading section 24 is a map image of a regular size displayable by game software on a conventional hand-held game machine or a household video game machine. The broad-range map image generated by the broad-range map image data reading section 26 is a map image covering a broader area than the regular sized map image. Thus, it will be appreciated that "broad-range" and "narrow-range" are mere references to relative sizes. The "broad-range map image" and the "narrow-range map image" may alternatively be referred to as a "reduced map" and an "enlarged map", respectively. Specifically, in an embodiment where the map image data storage section 25 stores narrow-range map (enlarged map) image data, the narrow-range map image data reading section 24 would only need the function of designating a read address, whereas the broad-range map image data reading section 26 would have the function of performing an image reduction in addition to the function of designating a read address. Conversely, in an embodiment where the map image data storage section 25 stores broad-range map (reduced map) image data, the broad-range map image data reading section 26 would only need the function of designating a read address, whereas the narrow-range map image data reading section 24 would have the function of performing an image enlargement in addition to the function of designating a read address.

If increase in the required memory capacity is not a problem, the map image data storage section 25 may be composed of a first storage section (not shown) for storing narrow-range map image data and a second storage section (not shown) for storing broad-range map image data, and the narrow-range map image data reading section 24 may control the data read from the first storage section whereas the broad-range map image data reading section 26 may control the data read from the second storage section.

When the player uses the stick 17 or his/her finger to designate a coordinate position on the LCD 12 or designate a moving direction, the touch panel 16 detects the designated coordinate data and passes it to the touch panel manipulation detection section 27. If a coordinate position is designated by a predetermined manipulation (e.g., the same coordinate position being designated twice in the fashion of a double click with a mouse), the player is giving an instruction indicating an area to be displayed as the narrow-range map (enlarged map) image, this area being centered around the coordinates designated in the broad-range map image which is being displayed on the display screen of the LCD 12. In this case, the manipulation detection section 27 generates center coordinate data of the narrow-range map image, and supplies the center coordinate data to a map image change imparting section 28. On the other hand, if the player uses the stick 17 or his/her finger to designate a moving direction (e.g., the coordinates as designated by the stick 17 or the user's finger gradually change so as to indicate a movement in a certain direction), the player is giving an instruction for moving or scrolling the broad-range map image, which is displayed on the display screen of the LCD 12, in the designated direction. In this case, the manipulation detection section 27 supplies moving direction data (together with moving amount data, if necessary) to the map image change imparting section 28. In the case of receiving center coordinate data indicating an area to be displayed as the narrow-range map image, the map image change imparting section 28 supplies the coordinate data to the narrow-range map image data reading section 24, so that a narrow-range map image after change (which is centered around the designated coordinate position) is displayed. On the other hand, in the case of receiving moving direction data, the map image change imparting section 28 supplies the moving direction data to the broad-range map image data reading section 26, so that broad-range map image data which has been scrolled in the designated moving direction is generated.

The display control section 23 merges the narrow-range map image data which has been generated by the narrow-range map image data reading section 24 with the object image data which has been generated by the object data generation section 22, and passes the result as a first game picture to a first LCD display driving circuit 29*a*, so as to be displayed on the LCD 11. Moreover, the display control section 23 passes the broad-range map image data which has been generated by the broad-range map image data reading section 26 as a second game picture to a second LCD display driving circuit 29*b*, so as to be displayed on the LCD 12. In the case where coordinate data has been supplied from the map image data change imparting section 28, the narrow-range map image data reading section 24 reads out image data of a narrow-range map (enlarged map) which is centered around the designated coordinate position, so that a narrow-range map image after change will be displayed on the LCD 11. On the other hand, if moving direction data has been supplied from the map image data change imparting section 28, the broad-range map image data reading section 26 will read out broad-range map image data which gradually changes so that the broad-range map will appear to be gradually moving in the designated moving direction. As a result of this, a moving (or scrolling) narrow-range map image will be displayed on the LCD 11.

The instruction of changes to be given through the manipulation of the touch panel 16 may be confined to a change of the displaying coordinates for the enlarged displaying of a narrow-range map or to changing the moving direction for the broad-range map, or may involve changes in both map images. In the case where the broad-range map image is to be moved in accordance with a moving instruction by means of the touch panel 16, not only the moving direction of the user's finger or the like, but also an amount of move (vector) may be detected so that the broad-range map image is moved by a distance which is in accordance with the detected moving amount.

Figure 3:
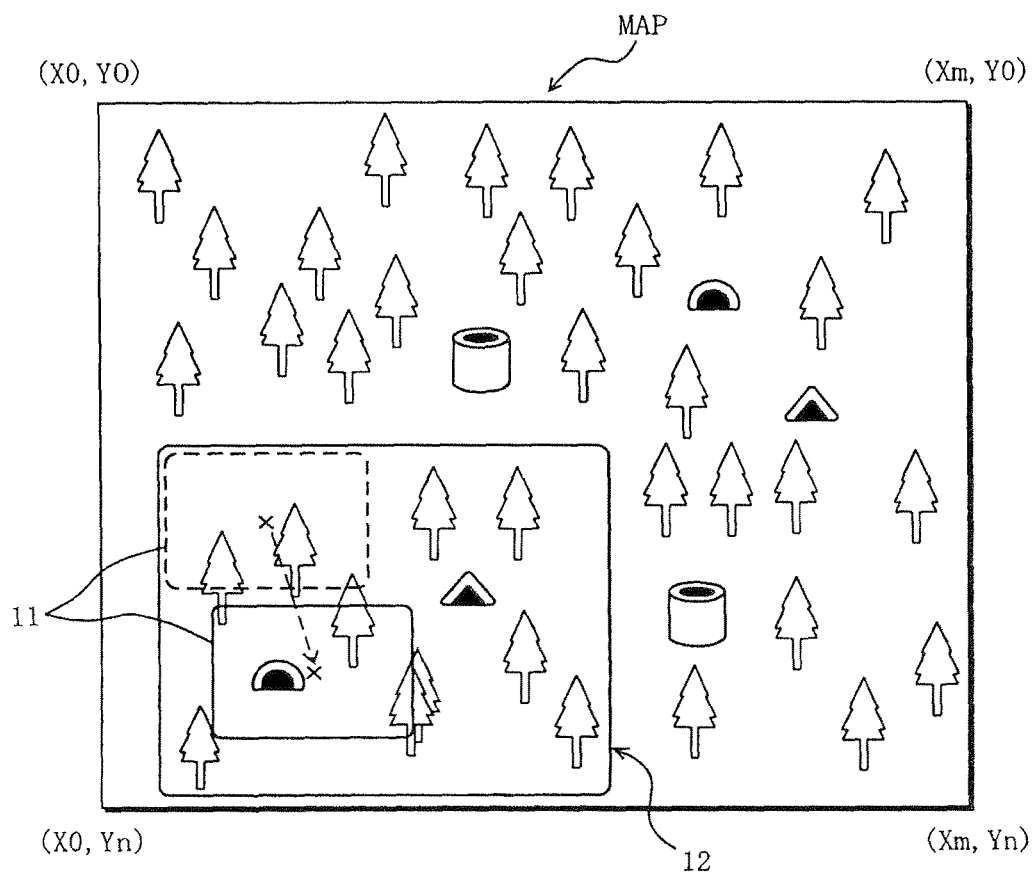
FIG. 3 is an illustration of the entirety of a game map of a game which is stored in a map image data storage section 25.

FIG. 3 is an illustration of the entirety of a game map of a game which is stored in a map image data storage section 25. The map (MAP) has a game space which is a multiple of times larger than the extent which can be displayed on the LCD 12. In the example shown in FIG. 3, it is assumed that the map (MAP) is twice as long and twice as wide as the display screen (or the displayed area) of the LCD 12, thus accounting for an area which is four times as large as the display screen (or the displayed area) of the LCD 12. It is further assumed that the narrow-range map to be displayed on the first LCD 11 has a theoretical displayed area which is 1/2.5 times as large as the displayed area of the LCD 12. However, since the physical screen sizes of the LCD 11 and the LCD 12 are equal, the narrow-range map on the LCD 11 is to be displayed as an enlarged map image of a portion of a background image in the broad-range map on the LCD 12, the ratio of enlargement being 2.5 times. In the actual game, moving objects (the player object and computer-controlled enemy objects and the like) may be merged on the narrow-range map image shown on the upper screen (i.e., the LCD 11). On the other hand, the LCD 12 may show the broad-range map image alone, or, if necessary, show a mark indicating where the player object is supposed to exist (or alternatively a smaller player object which has been reduced in accordance with the ratio of reduction of the broad-range map to the narrow-range map) as merged with the broad-range map image. Note that, in FIG. 3, any moving objects such as the player object and non-player objects (i.e., enemy objects or friend objects which cannot be controlled by the player) are omitted from illustration. In the actual game, a plurality of such maps (MAP) may be employed, to which map numbers are assigned for distinction.

Figure 4:
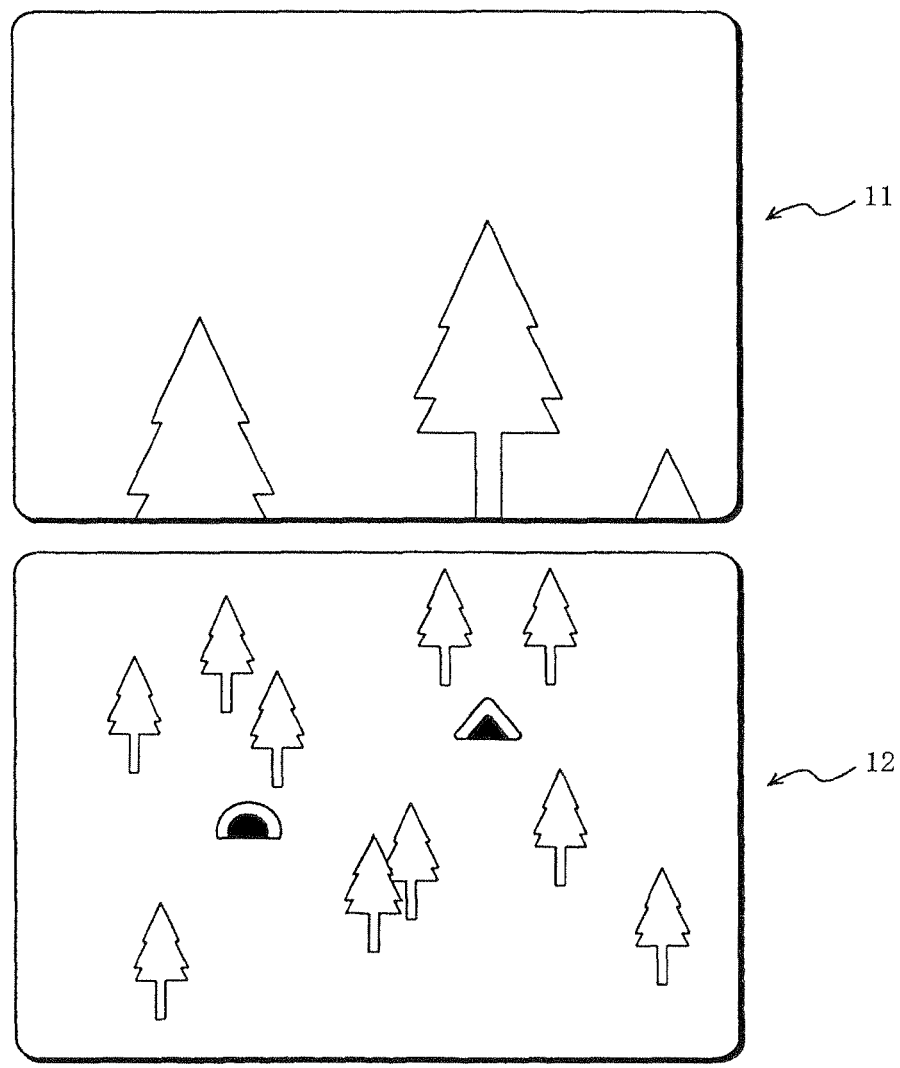
FIG. 4 is a diagram showing exemplary images to be displayed on a LCD 11 and a LCD 12 in an initial state of the broad-range map show in FIG. 3.

Next, with reference to the principle block diagram of FIG. 2 and some exemplary game screens, an exemplary operation in which the displaying coordinates for a narrow-range map image are designated by the user upon a broad-range map image will be described. First, it is assumed that a broad-range map image as depicted by a solid line in the lower left corner of FIG. 3 is being displayed on the second LCD 12, whereas a narrow-range map image, as depicted by a broken line in the upper left corner of the displayed broad-range map image, is being displayed on the first LCD 11. Assuming that the entire map (MAP) (any portion of which may be displayed as the broad-range map) spans an area from coordinates (X0, Y0) to coordinates (Xm,Yn), the broad-range map image which is currently displayed on the LCD 12 is an area delineated by the following four points: coordinates (X0,Yn/2), coordinates (Xm/2,Yn/2), coordinates (X0,Yn), and coordinates (Xm/2,Yn). On the other hand, the narrow-range map image to be displayed on the LCD 11 is an area extending from an origin which coincides with the coordinates (X0,Yn/2) of the broad-range map image, assuming that the origin of the narrow-range map image is located at its upper left corner. In this state, the LCD 11 and the LCD 12 will be displaying images which are shown in the upper half (upper screen) and the lower half (lower screen) of FIG. 4, respectively.

In this state, if the player were to move the player object shown on the narrow-range map image to a desired coordinate position, the narrow-range map image would appear to be moving (i.e., scrolling) only in accordance with the movement of the player object, which might feel slow to the player. The player would need to impatiently hold down the direction switch 15*a* in the relevant moving direction until the player object reaches the desired coordinate position. However, through the above-described input operations via the touch panel 16, the present invention can allow the player to move the player object to the desired coordinate position quickly and easily.

Figure 5:
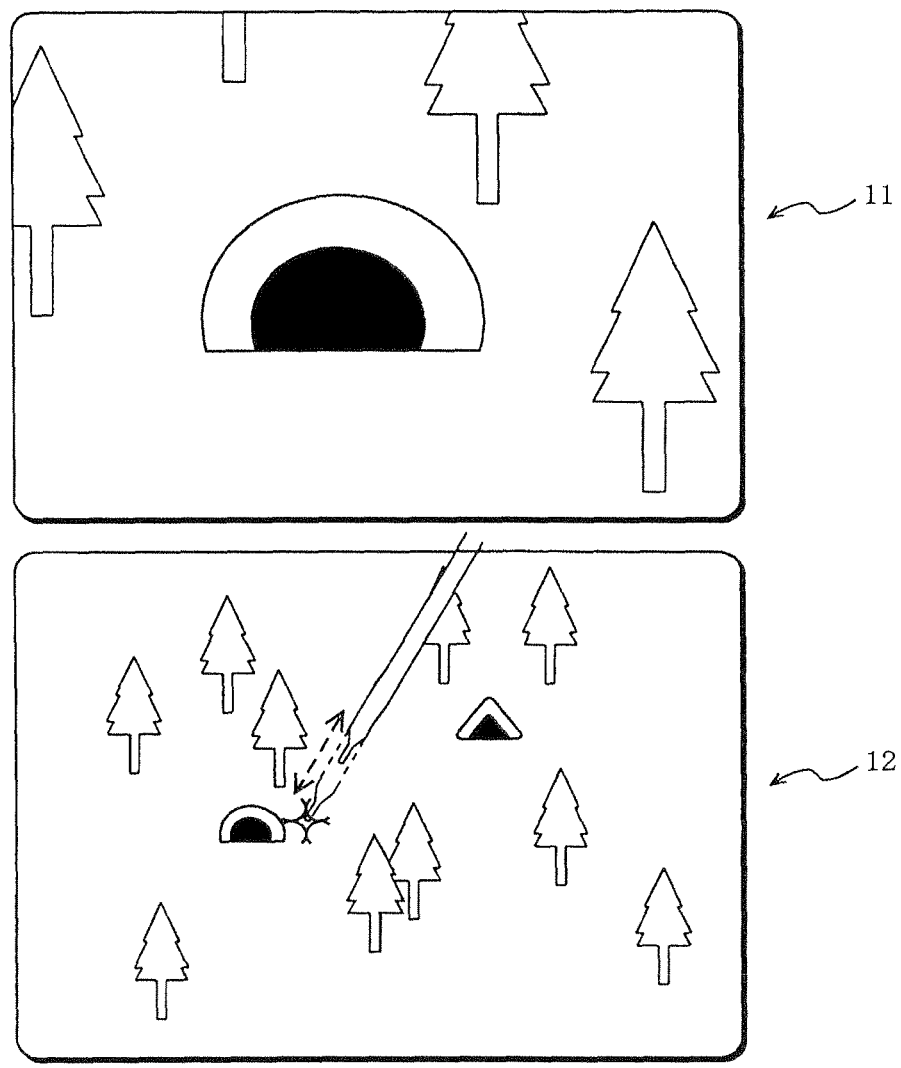
FIG. 5 is a diagram showing exemplary images on the LCD 11 and the LCD 12 in the case where a narrow-range map image is changed by designating a desired coordinate position in the broad-range map image shown in FIG. 3.

For example, let us assume that, in order to designate a change of the displaying coordinates for the narrow-range map to be displayed on the screen of the LCD 11, the player has operated the touch panel 16 by twice designating (i.e., double clicking) a coordinate position near a cave (shown by double semicircles), which is shown slightly to the left from the center of FIG. 5 (and near the lower left corner of FIG. 3). The reason for designating the same coordinate position twice is that it would be impossible with only one designation to distinguish whether a coordinate position for the narrow-range map to be displayed has been designated, or the stick 17 is going to be moved to further designate a moving direction. Any other method besides twice designation can be used so long as the two input operations can be distinguished (e.g., draw a circle). In response to the twice designation, the touch panel 12 generates coordinate data of the coordinate position (shown as "x" in FIG. 3) twice in a row, and outputs the generated coordinate data to the manipulation detection section 27. In response to receiving the same coordinate data twice in a row, the manipulation detection section 27 generates changed coordinate data and a signal indicating the change in the displaying coordinates, such that the narrow-range map image will be redisplayed so as to be centered around the new coordinate position. These data and signal are supplied to the narrow-range map image data reading section 24. In response, the narrow-range map image data reading section 24 generates a read address for map image data based on the changed coordinate data, reads out map image data defining a displayed area on the LCD 11 centered around the new coordinate position, and subjects the data to an enlargement process before being output to the display control section 23. The display control section 23 generates merged image data, which contains moving object images such as the player object and/or the non-player objects being merged on the changed narrow-range map image, and supplies the generated merged image data to the first LCD display driving circuit 29a so as to be displayed on the LCD 11. As a result, the LCD 11 displays the narrow-range map image as shown in the upper half (upper screen) of FIG. 5, whereas the LCD 12 displays the broad-range map image as shown in the lower half (lower screen) of FIG. 5.

Thus, within the broad-range map image displayed on the screen of the LCD 12, the player can designate through a simple operation a narrow-range map (enlarged map) for being displayed on the LCD 11, around a desired coordinate position. Therefore, by going back and forth between the two kinds of maps, the player can select a displayed area of the narrow-range map to his or her own advantage for playing the game, and such changes can be made with an arbitrarily timing. This allows the user to play the game with strategic thoughts, and enhances the strategical aspect of the game playing.

Figure 6:
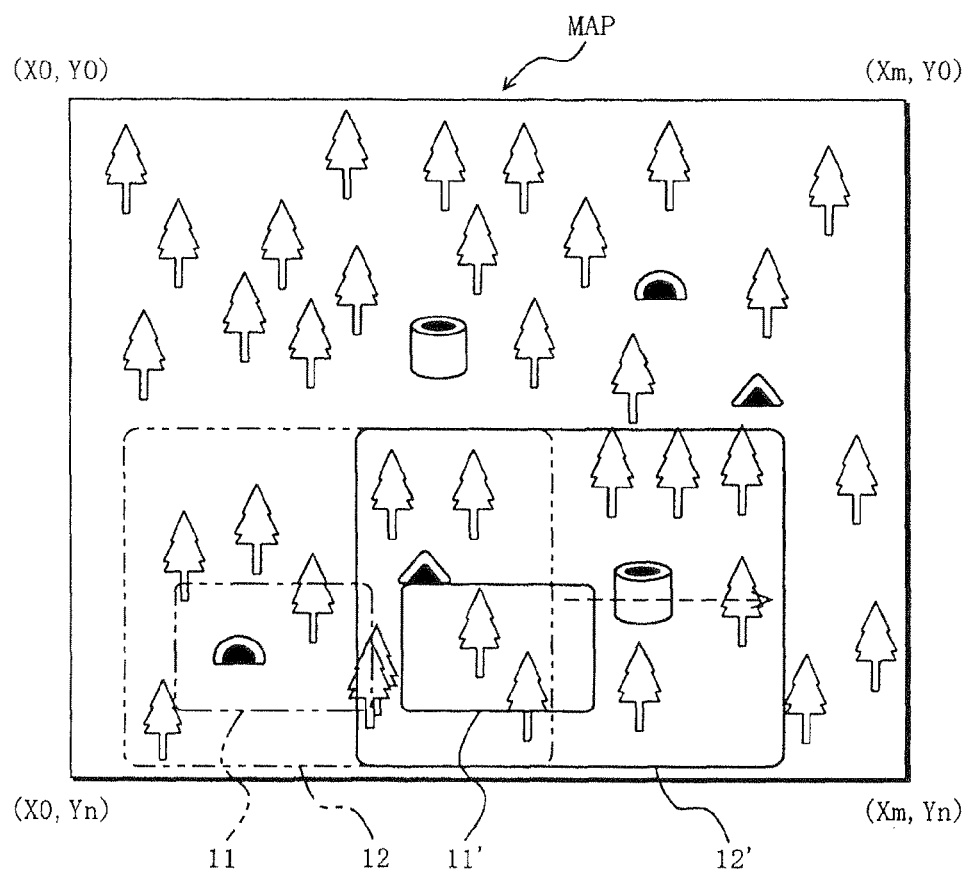
FIG. 6 is an illustration of the entire game map within which a broad-range map to be displayed on the LCD 12 is moved (scrolled)
Figure 7:
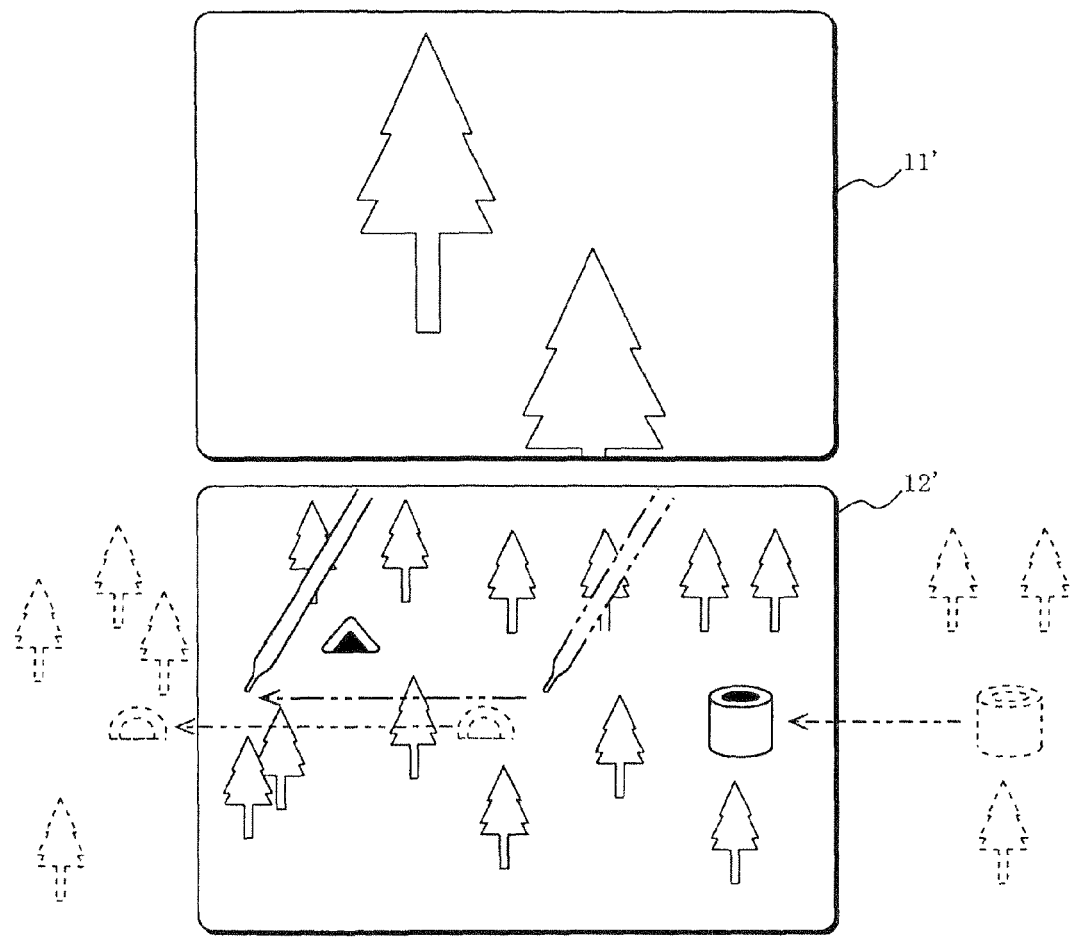
FIG. 7 is a diagram showing exemplary images displayed on the LCD 11 and the LCD 12 in the case where the broad-range map is moved (scrolled)

Next, with reference to FIG. 6 and FIG. 7, an exemplary operation in which the broad-range map image displayed on the LCD 12 is moved (or gradually scrolled) in a designated direction will be described. For example, in order to scroll the broad-range map image displayed on the LCD 12 to the right, the map (MAP) may be moved to the left against the stationary LCD 12. In this case, in order to give a moving instruction to move the broad-range map image shown in FIG. 6 to the right, the player may move the stick 17 to the left on the touch panel 16 (see the manipulation example of FIG. 7). The coordinate data generated by the touch panel 16 will gradually decrease over time with respect to the x-axis component, while the y-axis component remains constant. If such coordinate data, of which only the x-axis component decreases over time, is input to the manipulation detection section 27, the manipulation detection section 27 detects a moving instruction in the left direction. The manipulation detection section 27 derives a moving amount through coordinate calculations (if necessary), and supplies these results to the map image data change imparting section 28. Based on the coordinate data of which only the x-axis component gradually changes, the map image data change imparting section 28 generates control data which indicates gradual changes in the basic read address (e.g., coordinates (X1,Yn/2) at time t1; coordinates (X2,Yn/2) at time t2; coordinates (X3,Yn/2) at time t3, and so on), and supplies the generated control data to the broad-range map image data reading section 26. In each of the period between t1 and t2, the period between t2 and t3, the period between t3 and t4, and so on, the broad-range map image data reading section 26 reads one screenful data of a broad-range map image, and supplies the data of the broad-range map image thus read to the display control section 23. As a result, the broad-range map image will be displayed on the LCD 12 so as to gradually scroll to the right, from t1 to t2 and to t3, and so on. Then, after the broad-range map image has been moved by a moving amount (or distance) designated together with the moving direction, the scrolling of the broad-range map image is stopped, after which the same broad-range map image will be continuously displayed.

On the other hand, in order to move the broad-range map image to the left, the stick 17 may be moved to the right so that coordinate data with a gradually increasing x-axis component is generated; thus, the broad-range map image can be moved to the left. In order to move the broad-range map image upwards, the stick 17 may be moved down so that coordinate data with a gradually increasing y-axis component is generated; thus, the broad-range map image can be moved upwards. In order to move the broad-range map image downwards, the stick 17 may be moved up so that coordinate data with a gradually decreasing y-axis component is generated; thus, the broad-range map image can be moved downwards. Furthermore, a moving instruction in an oblique direction may be given, such that coordinate data entailing changes in both the x-axis component and the y-axis component is generated, whereby the broad-range map image can be moved in an oblique direction.

Alternatively, the hand-held game apparatus may be arranged so that the moving direction of the stick 17 and the scrolling direction of the broad-range map image are the same. In this case, the manipulation detection section 27 will reverse the polarity (+,−) of any increase or decrease in the x-axis component and/or the y-axis component when supplying the coordinate data to the map image change imparting section 28.

Although the above example illustrates a case where the player object is not shown in the broad-range map image displayed on the LCD 12, it will be appreciated that a small version of the player object may be displayed on the LCD 12. In this case, the object image data generation section 22 may be imparted with a function of generating a reduced player object (small-size object) by reducing the player object (large-size object) which is displayed on the LCD 11 in accordance with the ratio of reduction of the broad-range map to the narrow-range map, and the display control section 23 may merge the small-size object with the broad-range map image so as to be together displayed on the LCD 12. In this case, the moving velocities of the large-size object displayed on the LCD 11 and the small-size object displayed on the LCD 12 may be adjusted according to the ratio of reduction of the broad-range map to the narrow-range map, so that the large-size object appears to move quicker and that the small-size object appears to move slower, thus establishing synchronization between the two displayed objects.

The principle block diagram of FIG. 2 illustrates functional blocks of a hand-held game apparatus and a game program according to one embodiment of the present invention. In more practical embodiments, however, the operation switch manipulation detection section 21, the object image data generation section 22, the display control section 23, the narrow-range map image data reading section 24, the broad-range map image data reading section 25, the touch panel manipulation detection section 27, and the map image change imparting section 28 will be implemented in the form of a game program and a processing circuit (CPU) which executes the game program. Such a practical embodiment will be described in detail below.

Figure 8:
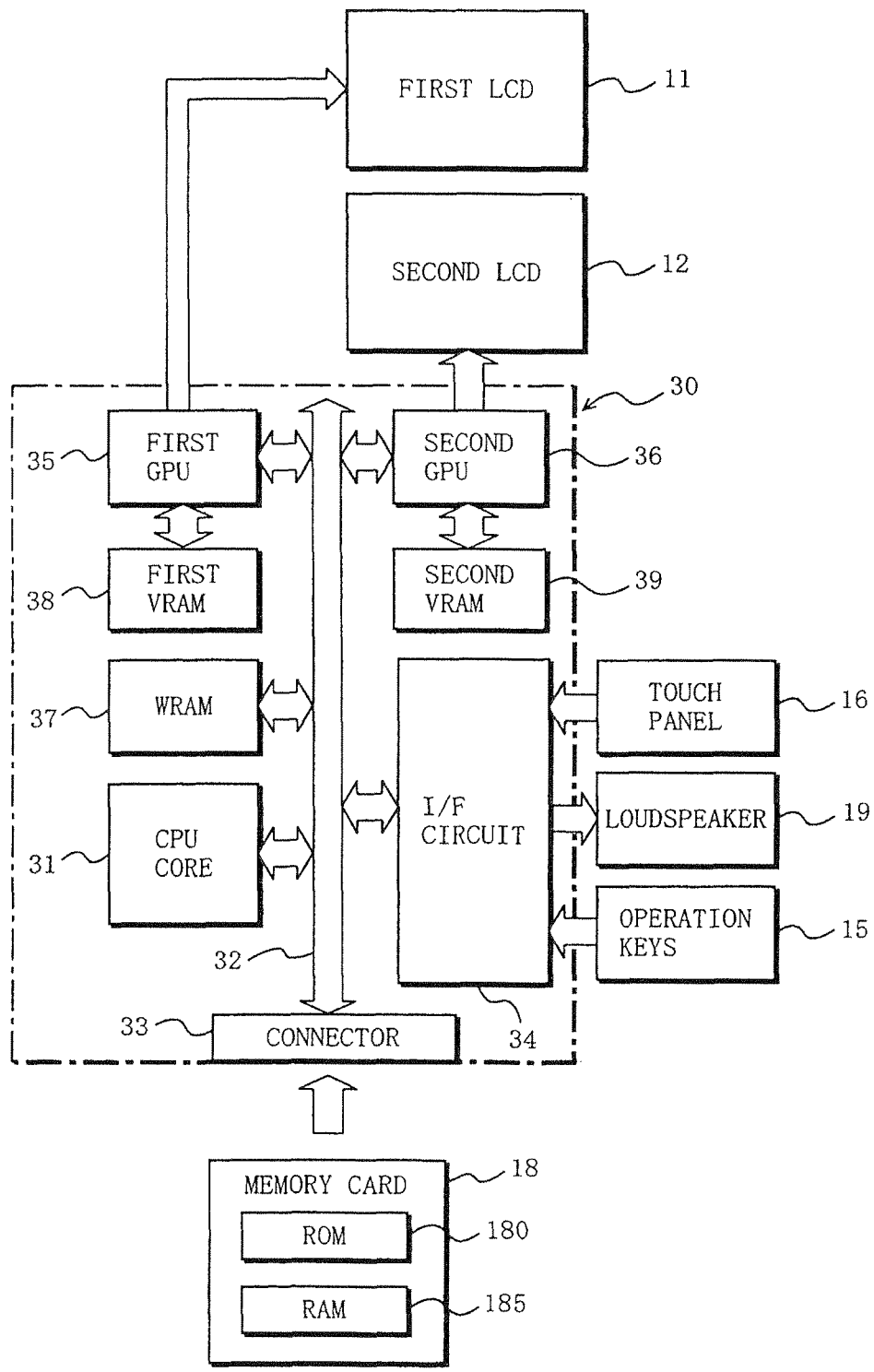
FIG. 8 is a block diagram illustrating a hand-held game apparatus according to another embodiment of the present invention.

FIG. 8 is a block diagram illustrating a hand-held game apparatus according to another embodiment of the present invention. In FIG. 8, a CPU core 31 is mounted on an electronic circuit board 30 which is accommodated in a housing 13. Via a bus 32, a connector 33, an input/output interface (I/F) circuit 34, a first graphics processing unit (first GPU) 35, a second graphics processing unit (second GPU) 36, and a working RAM (hereinafter referred to as "W-RAM") 37 are connected to the CPU core 31. A memory card 18 is detachably connected to the connector 33. The memory card 18 internalizes a ROM 180 and an S-RAM 185. Backup power from a button battery (not shown) is supplied to the S-RAM 185 in order to prevent the stored data from being destroyed when power supply thereto is stopped as the memory card 18 is detached from the hand-held game apparatus 10. Read from the ROM 180 is controlled by the CPU core 31. Write to and/or read from the S-RAM 185 is controlled by the CPU core 31. An operation switch section 15, a touch panel 16, and a loudspeaker 19 are connected to the I/F circuit 34. The loudspeaker 19 is placed inside a sound hole 14b. A first video RAM (hereinafter referred to as "V-RAM") 38 is connected to the first GPU 35. A second video RAM (hereinafter referred to as "V-RAM") 39 is connected to the second GPU 36.

Based on a program which is stored in the ROM 180, the CPU core 31 reads out one unit of map image data (e.g., the entire map image data corresponding to a given map number, as indicated by "MAP" in FIG. 3), and transfers the map image data to the W-RAM 37. Moreover, from the ROM 180, the CPU core 31 reads a program for controlling the generation of a broad-range map image and a program for controlling the generation of a narrow-range map image, and supplies the former program to the GPU 36 and the latter program to the GPU 35. Then, the GPU 35 performs a read from the W-RAM 37 to generate narrow-range map image data, writes to the V-RAM 38 narrow-range map image data to be displayed as a single screen (i.e., map image data corresponding to the area 11 in FIG. 3) on the LCD 11, and performs a read from the V-RAM 38 with a predetermined timing to cause the narrow-range map image to be displayed on the LCD 11. Concurrently, the GPU 36 performs a read from the W-RAM 37 to generate broad-range map image data, writes to the V-RAM 39 broad-range map image data to be displayed as a single screen (i.e., map image data corresponding to the area 12 in FIG. 3) on the LCD 12, and performs a read with a predetermined timing to cause the broad-range map image to be displayed on the LCD 12.

In the case where the map image data which is set and stored in the ROM 180 (and written to the W-RAM 37) is a narrow-range map image, the GPU 35 generates map image data in the same size and writes the generated map image data to the V-RAM 38, and the GPU 36 generates reduced map image data and writes the reduced map image data to the V-RAM 39. On the other hand, in the case where the map image data which is set and stored in the ROM 180 is a broad-range map image, the GPU 36 generates map image data in the same size and writes the generated map image data to the V-RAM 39, and the GPU 35 generates enlarged map image data and writes the enlarged map image data to the V-RAM 38. If increase in the required memory capacity is not a problem (as in the case of using an optical information storage medium instead of a memory card, for example), both the broad-range map image data and the narrow-range map image data may be stored in an external memory.

Figure 9:
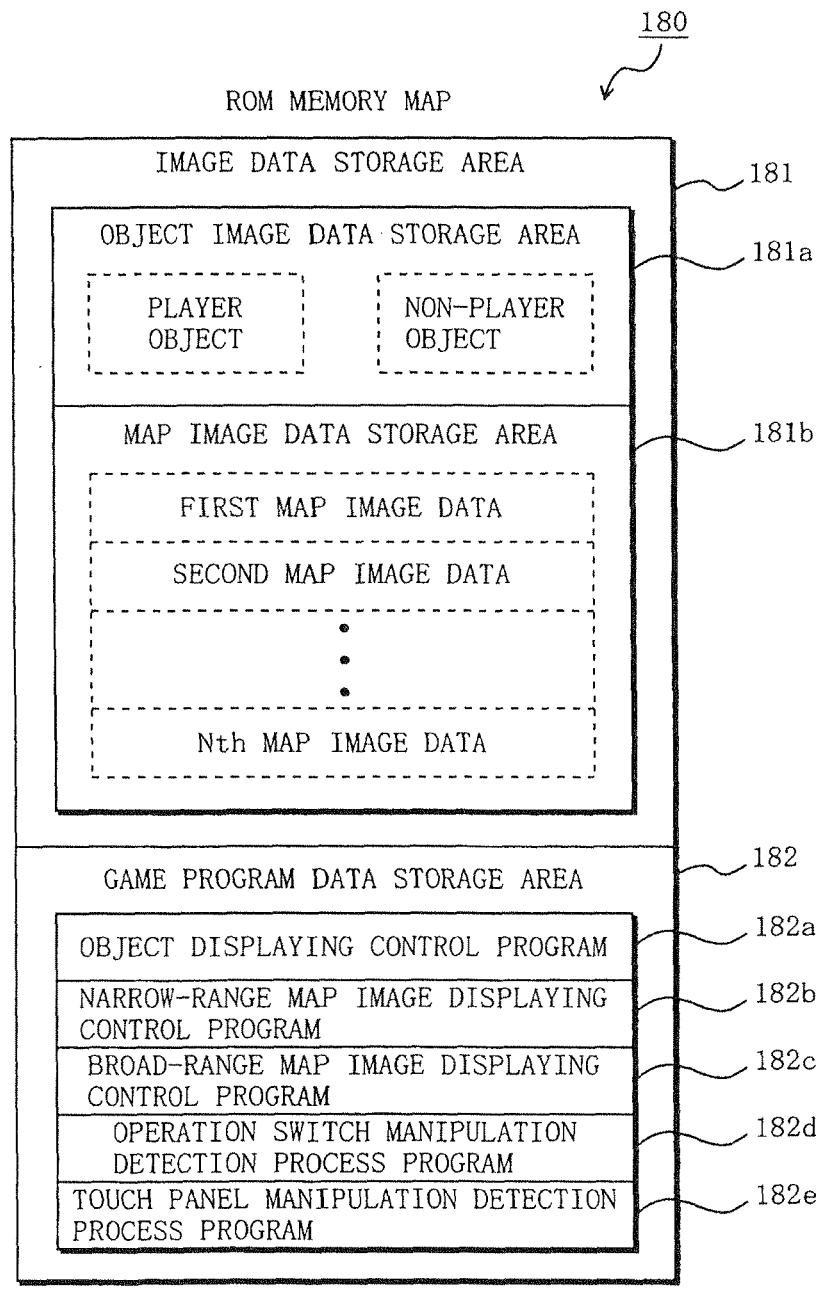
FIG. 9 is a memory map illustrating storage areas in a ROM 180.

FIG. 9 is a memory map illustrating data stored in the ROM 180. In FIG. 9, the ROM 180 generally includes storage areas 181 and 182. The storage area 181, which is a storage area for storing image data, includes a storage area 181*a* for storing object image data and a storage area 181*b* for storing map image data. The object image data storage area 181*a* stores a player object and moving objects other than the player object (i.e., enemy objects and friend objects). The storage area 181*b*, which is a storage area for storing map image data, stores map image data of each of first to $N^{th}$ maps.

Note that only either one of the narrow-range map image or the broad-range map image needs to be stored in the memory, because the other map image can be generated by enlarging or reducing the stored map image data. In the case where the map image is a three-dimensional image, the map image is generated from a plurality of polygon data for specifying shapes, with a texture (which defines a pattern and/or color) being attached to a shape which is defined by each polygon data. In this case, the broad-range map image and the narrow-range map image may be generated by varying the distance data from an imaginary camera to each polygon, and the generated images may be converted to bitmap image data before being stored to the V-RAMs 38 and 39.

The storage area 182, which is a storage area for storing game program data, includes storage areas 182*a*, 182*b*, 182*c*, 182*d*, and 182*e*. The storage area 182*a* stores an object displaying control program. The storage area 182*b* stores a narrow-range map image displaying control program. The storage area 182*c* stores a broad-range map image displaying control program. The narrow-range map image displaying control program and the broad-range map image displaying control program are programs for generating or changing a broad-range map image and a narrow-range map image, respectively, in accordance with the manipulation of the direction switch 15*a* and/or the manipulation of the touch panel 16.

The storage area 182*d* stores an operation switch manipulation detection process program. The operation switch manipulation detection process program is a program which detects, for example, up, down, right, or left directions indicated on the direction switch 15*a* and a moving amount (as determined from the duration for which the indication of a direction is given), or which one of the operation switches 15*c* and 15*e* has been pressed, such detection being made for every short predetermined period of time. The storage area 182*e* stores a touch panel manipulation detection process program. The touch panel manipulation detection process program reads coordinate data which varies in response to the manipulation of the touch panel and temporarily stores the coordinate data for every short predetermined period of time (e.g., a frame), and detects changes in the coordinate data for every long predetermined period of time (e.g., tens to hundreds times the frame period). If the result of the detection indicates that the same (or substantially the same) coordinate data is being repeated, the touch panel manipulation detection process program detects that an instruction to change a displaying coordinate position for the narrow-range map image is being given. On the other hand, if the result of the detection indicates that the coordinate data is changing gradually and continuously, the touch panel manipulation detection process program detects that a moving direction is being designated, based on the amounts of changes in the x-axis component and the y-axis component. Moreover, a moving amount (amount or distance of scroll) may be detected based on a vector amount which combines the amounts of change in both the x-axis component and the y-axis component. The details of the processes to be performed by the respective programs stored in the storage areas 18*a* to 18*e* will be described later with reference to FIGS. 10 to 12.

Figure 10:
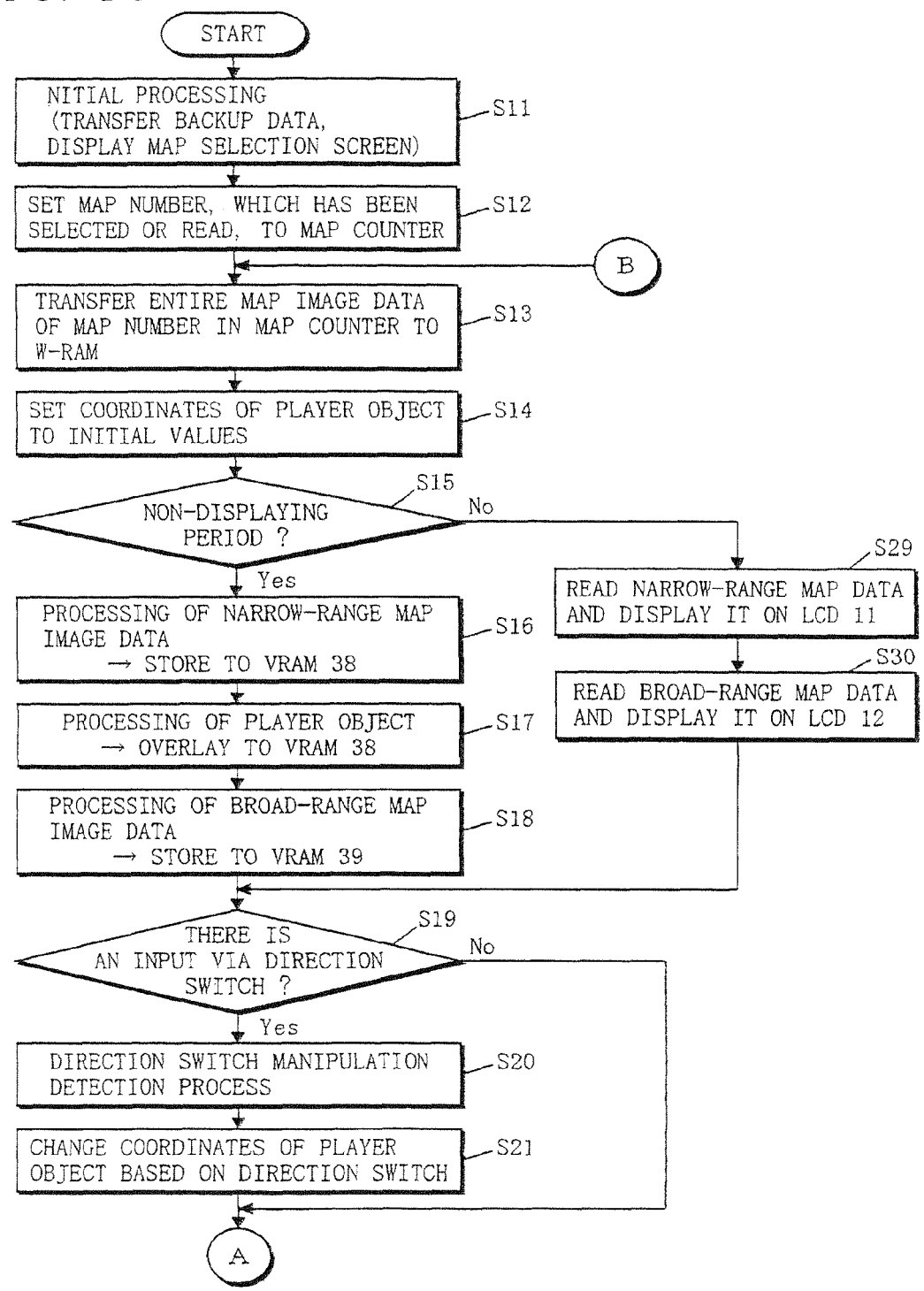
FIG. 10 is a flowchart (former half) of exemplary game software for use with a hand-held game apparatus on which a game is to be played based on a broad-range map and a narrow-range map.
Figure 11:
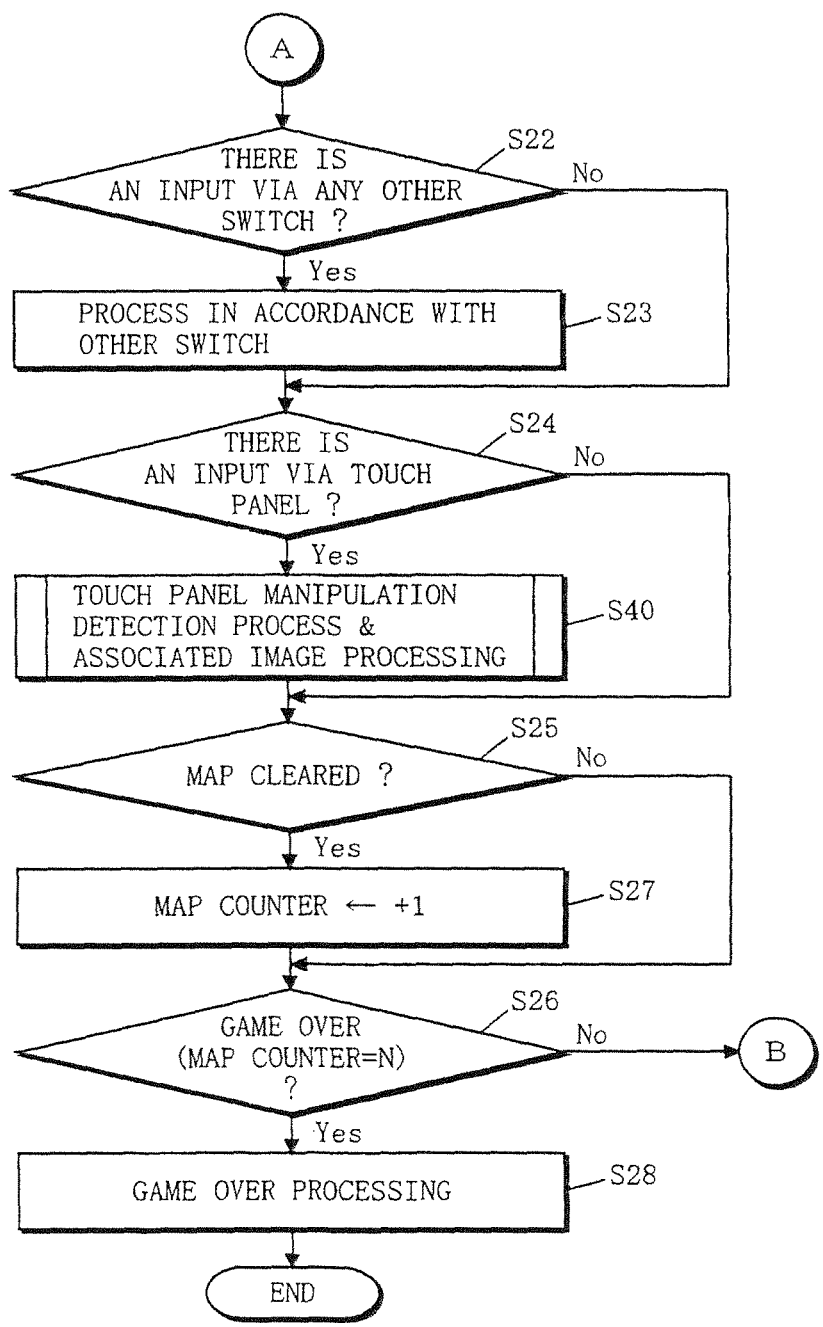
FIG. 11 is a flowchart (former half) of exemplary game software for use with a hand-held game apparatus on which a game is to be played based on a broad-range map and a narrow-range map.
Figure 12:
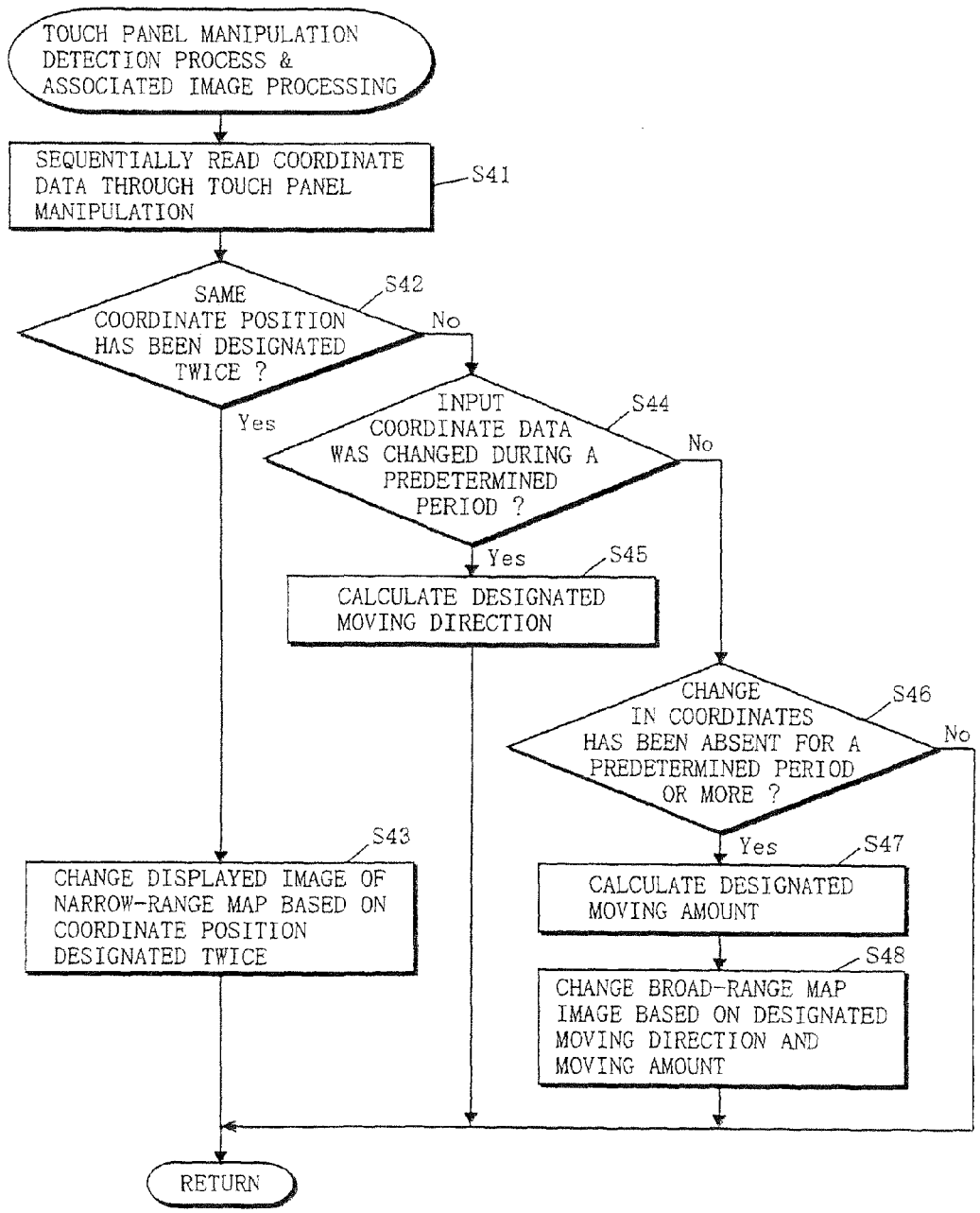
FIG. 12 is a detailed flowchart of a touch panel manipulation detection process and an associated image processing.

FIGS. 10 and 11 are flowcharts of exemplary game software for use with a hand-held game apparatus on which a game is to be played based on a broad-range map and a narrow-range map. FIG. 12 is a detailed flowchart of a touch panel manipulation detection process and an associated image processing. Next, with reference to FIG. 1 and FIGS. 3 to 12, a specific operation according to the present embodiment will be described, by also referring to the flowcharts of FIGS. 10 to 12.

Once a power switch (not shown) is activated, the CPU core 31 begins to perform the following processes based on the programs stored in the storage area 182 of the ROM 18. First, at step S11, initial processing is performed, which may proceed as follows, for example. After an initial clear is performed for the W-RAM 37 and the V-RAMS 38 and 39, backup data (which may be, in the case where the game has already been being played, game progress data such as the cleared map numbers, obtained experience points, and obtained items up to the last game play) stored in the reading RAM 185 is read, and written to a backup data storage area (not shown) in the W-RAM 37. Moreover, a selection screen for starting the game play is displayed to allow the player to select whether to begin the game from map number 1 (i.e., the first map) or continue from the map number from the last game play. At step S12, the selected map number (or map number "1" in the case of playing the game anew) is set in a map counter (or a map register, which may be an address in the W-RAM 37, although not shown). Thus, preparatory processing for beginning the game play is performed.

At the next step S13, the entire map image data of the map number which is set in the map counter (e.g., the entire map MAP shown in FIG. 3) is read from the ROM 18, and written to the W-RAM 37. At step S14, the coordinate data of the player object is set to initial values. For example, the coordinates of the upper left corner of the broad-range map image displayed on the LCD 12 may be written to a register (an address in the W-RAM 37) for storing the coordinate position of the player object.

During a non-displaying period, i.e., a period in which the LCD 11 and the LCD 12 do not display images, the processes of steps S15 to S18 are performed. Specifically, it is determined at step S15 whether it is a non-displaying period of the LCD 11 and the LCD 12 now. If it is determined to be a non-displaying period, at step S16, the CPU core 31 and the GPU 35 cooperate to perform processing associated with a narrow-range map image, based on the narrow-range map image displaying control program. Specifically, the CPU core 31 instructs the GPU 35 to set a coordinate position according to initial values. For example, in the exemplary image shown in FIG. 3, in order that a narrow-range map image spanning the area shown by the broken line 11 be displayed on the LCD 11, MAP coordinates (X0,Yn/2) are set so that the coordinates of the upper left corner of the display screen of the LCD 11 become offset values. Then, a narrow-range map image data spanning the displayed area shown by the broken line 11 is read from the W-RAM 37 and supplied to the GPU 35. The GPU 35 enlarges the narrow-range map image data in accordance with the enlargement ratio for the narrow-range map so that the narrow-range map image will occupy the screen size of the LCD 11, and writes the enlarged narrow-range map image data to the V-RAM 38, thus temporarily storing the enlarged narrow-range map image data. At step S17, processing associated with moving objects (including the player object and the non-player objects) is performed, whereby the image data of the moving objects is written over the narrow-range map image data stored in the V-RAM 38. As a result, an image combing the narrow-range map image and the moving object images is now stored in the V-RAM 38. In the case where priority levels can be assigned to the map image and the moving objects (or any number of dots thereof), any image data to be displayed at the same coordinates (or dot) will be stored in the V-RAM 38 in such a manner that, based on priority data (or Z value data), the image data having a higher priority is written over the image data having a lower priority. As a result, the higher-priority image will be displayed on the LCD 11 so as to appear as overlaying the lower-priority image.

At the next step S18, based on the broad-range map image displaying control program, the CPU core 31 and the GPU 36 cooperate to perform processing associated with the broad-range map image.

Specifically, the CPU core 31 instructs the GPU 36 to set a coordinate position according to initial values. For example, in the exemplary image shown in FIG. 3, in order that a broad-range map image spanning the area shown by the broken line 12 be displayed on the LCD 12, MAP coordinates (X0,Yn/2) are set so that the coordinates of the upper left corner of the display screen of the LCD 12 become offset values. Then, a broad-range map image data spanning the displayed area shown by the broken line 12 is read from the W-RAM 37 and supplied to the GPU 36. The GPU 36 writes the broad-range map image data to the V-RAM 39, thus temporarily storing the broad-range map image data.

In the case where a small-size player object is to be displayed on the LCD 12, it will be appreciated that a process of generating a small-size object in accordance with the reduction ratio for the map size, as well as an overlaying process therefor, are to be performed between step S17 and step S18.

At step S19, it is determined whether an input has been made by means of the direction switch 15*a*. If it is determined that such an input has been made, control proceeds to step S20. On the other hand, if it is determined that no such input has been made, control proceeds to step S22. If an input has been made by means of the direction switch 15*a*, step S20 executes a process of detecting the manipulation performed for the direction switch 15*a*. For example, if any one of the "up", "down", "right", or "left" direction of the direction switch 15*a* has been pressed, a key code corresponding to that direction is read and temporarily stored to an internal register (not shown). At step S21, a process of changing the current coordinate position of the player object based on the manipulation of the direction switch 15*a* is performed. At step S22, it is determined whether an input has been made by means of any other operation switches 15*b* to 15*f*. If it is determined an input has been made by means of any one of the operation switches 15*b* to 15*f*, an input processing based on that switch is performed at step S23. After step S23, or if step S22 finds that no input has been made by means of the operation switches 15*b* to 15*f*, control proceeds to step S24. Thus, processes based on the manipulations of the direction switch 15*a* and any other operation switches 15*b* to 15*f* are performed.

At step S24, it is determined whether an input of coordinates has been made through manipulation of the touch panel 16. If an input of coordinates has been made through manipulation of the touch panel 16, the subroutine process of step S40, i.e., a touch panel manipulation detection process and an associated image processing based on the detection (see FIG. 12), is performed, whose details will be described later.

At step S25, it is determined whether a map clear condition has been met. If it is determined that the map has not been cleared, step S26 then determines whether the game is over. The game over determination of step S26 is based on whether the count value of the map counter has reached the largest map number (N) or whether a game over condition (e.g., the hit points or life of the player having reached "0") has been met. If step S25 finds that the map clear condition has not been met and if step S26 finds that the game over condition has not been met either, control returns to the aforementioned step S13, so that the processes from steps S13 to S26 and steps S29 and S30 (described later) will be repeated with a certain periodicity.

On the other hand, if step S15 finds that it is not a non-displaying period of the LCD 11 and the LCD 12 (that is, it is a displaying period), control proceeds to step S29. At step S29, the GPU 35 performs a read from the V-RAM 38 at a displaying timing of the LCD 11, so that narrow-range map image data is sequentially read during one frame period in synchronization with frame scanning, whereby the narrow-range map image is displayed on the LCD 11. Also, at step S30, the GPU 36 performs a read from the V-RAM 39 at a displaying timing of the LCD 12, so that broad-range map image data is sequentially read during one frame period in synchronization with frame scanning, whereby the broad-range map image is displayed on the LCD 12.

Thus, an image combining the narrow-range map image and the moving objects is displayed on the LCD 11, whereas the broad-range map image is displayed on the LCD 12.

Next, with reference to FIG. 12, the subroutine process of a touch panel manipulation detection process and an associated image processing based on the detection will be described. At step S41, coordinate data acquired through manipulation of the touch panel is read, and written to a register (an address of the W-RAM 37). At step S42, it is determined whether the same coordinate position has been designated twice. For example, if a set of coordinates in the neighborhood of the cave located in a lower left portion of FIG. 3 has been designated twice, it is determined that the same coordinate position has been designated twice, and control proceeds to step S43, where a process of changing the narrow-range map based on the coordinate position which has been designated twice is performed. In other words, in order to display a narrow-range map as delineated by the solid line which lies to the lower right of the narrow-range map (enlarged map) delineated by the broken line in FIG. 3, image data of a narrow-range map which is centered around a coordinate position near the cave is read from the W-RAM 37, and written to the V-RAM 38. Thereafter, control returns to step S25. Then, when the processes of steps S13 to S19 are performed during a displaying period for the next frame, the narrow-range map image data which has been updated at step S29 is read by the GPU 35, whereby the narrow-range map image as shown in the upper half of FIG. 5 is displayed on the LCD 11.

If the manipulation of the touch panel 16 is not twice-designations of the same coordinate position, but an instruction of a moving direction as indicated by moving the stick 17, step S42 determines that the same coordinate position has not been designated twice, and control proceeds to step S44. At step S44, it is determined whether the input coordinate data has been changed during a predetermined period of time. If it is determined that the input coordinate data has been changed during a predetermined period of time, step S45 calculates the moving direction which has been designed. This process of calculating the moving direction is, for example, a process of deriving a tilt (angle) from the amounts of changes in the x-axis component and the y-axis component. Thereafter, control returns to step S25. In general, during the instruction of a moving direction, steps S13 to S26 and S41 to S45 are repeated a number of times, while gradually changing coordinate data are sequentially detected, and, once the stick 17 has been moved by a desired distance, the player takes the stick 17 off the screen of the LCD 12. Therefore, at one point during the repetitions of steps S13 to S26 and S41 to S45, absence of changes in the input coordinates for a predetermined period of time is detected, and then control proceeds to step S46. At step S46, absence of input coordinates as well as absence of changes in the coordinates for a predetermined period of time longer than the period of time at step S44 are detected, after which control proceeds to step S47. At step S47, a process of calculating the moving direction (or distance) which has been designed is performed. This process is a process of calculating a vector amount, during a period since the coordinates of the stick 17 were first detected, after which a change in the designated coordinates is detected, until a relatively long absence of changes in the input coordinates is detected; the vector amount is calculated between the initially-designated coordinate position and the coordinate position immediately before the change in the input coordinates becomes undetectable. At the next step S48, a process of gradually changing the broad-range map image, so as to gradually move in the designated moving direction by the calculated moving amount, is performed. Thus, as shown in FIG. 6, a map image which has been moved (scrolled) in the direction and by the moving amount as designated through the manipulation of the touch panel 16 is displayed on the LCD 12.

Thus, the player is able to play the game while watching either one or both of the narrow-range map image and the broad-range map image depending on the situation. As necessary, the player can also manipulate the touch panel 17 to change displaying coordinates (or displayed area) for the narrow-range map image, or scroll the broad-range map image, to his or her own advantage for playing the game.

On the other hand, if step S25 finds that the map clear condition has been met, the count value of the map counter is incremented by one at step S27. Then, unless step S26 finds that the game over condition has been met, control returns to step S13 to repeat a similar flow to that described above, so that displaying processes for map images corresponding to the next map number (i.e., processes of steps S13 to S26 and S41 to S48) are performed.

If step S26 finds that the game over condition has been met, control proceeds to step S28, where game over processing is performed. In the game over processing, data indicating the game progress which is stored in the W-RAM 37 (e.g., the cleared map numbers, obtained experience points, hit points, life, obtained items, and various other data) is read by the CPU core 31, and written to the RAM 185 of the memory card 18. Thus, the entire game processing operation is completed.

Figure 13:
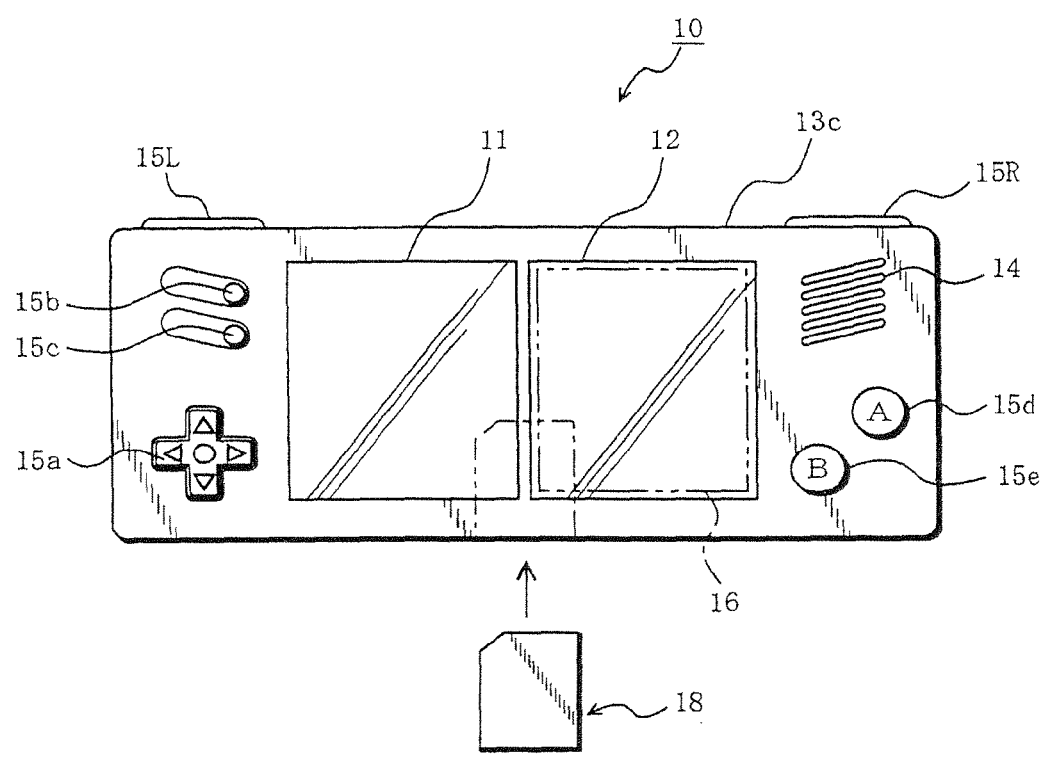
FIG. 13 is a view showing the outer look of a hand-held game apparatus according to another embodiment of the present invention (where liquid crystal display sections embodying two screens are disposed side by side)

The above embodiments illustrate examples where two physically separate LCDs 11 and 12 are disposed one on top of the other (i.e., two vertically-arranged screens) as liquid crystal display sections embodying two screens. Alternatively, as shown in FIG. 13, a single housing 13c which is elongated along the horizontal direction may be used, while omitting the upper housing 13a, so that the LCDs 11 and 12 embodying two screens are accommodated side by side in the housing 13c. Since it is likely that there are more right-handed users than left-handed users, the LCD 12 having the touch panel 16 mounted thereon is preferably located on the right side, whereas the LCD 11 is located on the left side. Of course, an opposite structure may be adopted in the case of producing a hand-held game apparatus for left-handed users.

Figure 14:
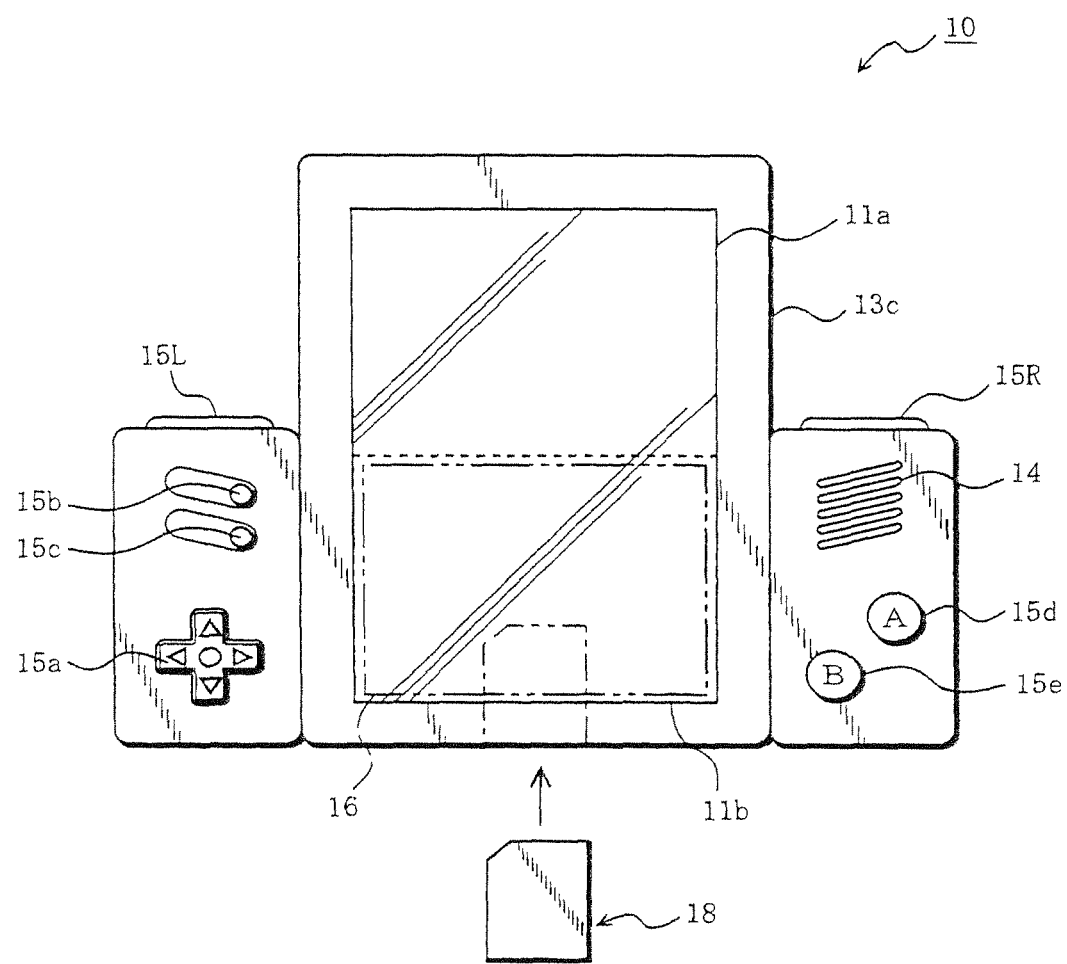
FIG. 14 is a view showing the outer look of a hand-held game apparatus according to still another embodiment of the present invention (using a single liquid crystal display device to realize liquid crystal display sections embodying two screens, which are disposed one on top of the other)
Figure 15:
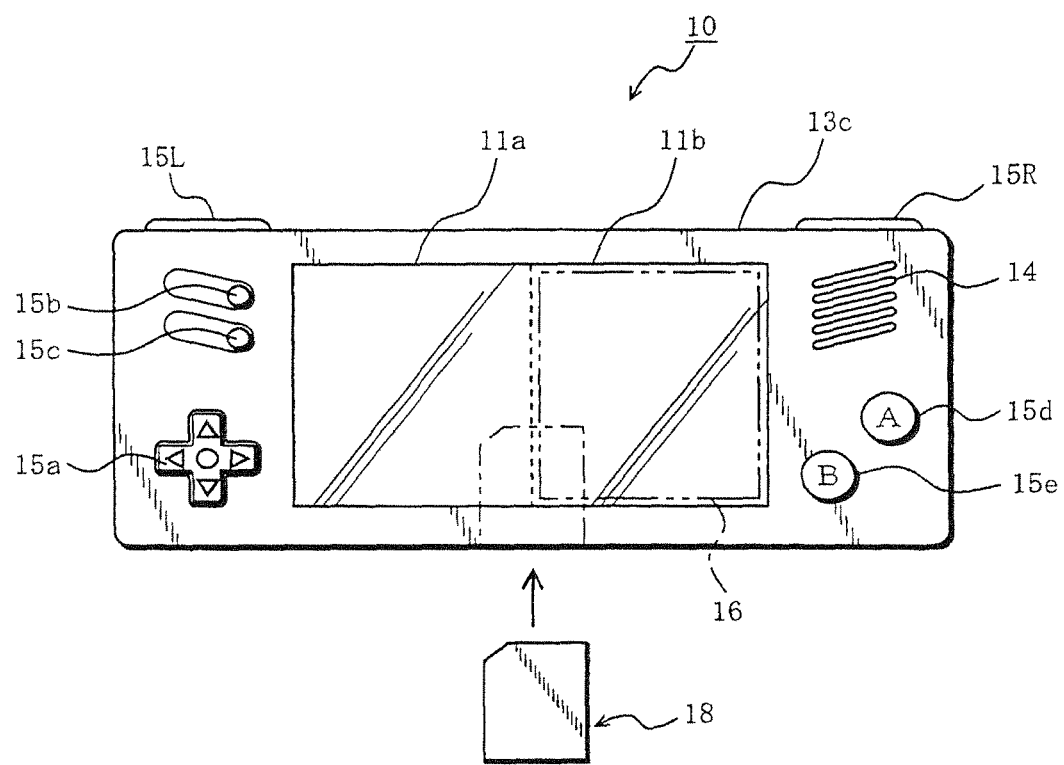
FIG. 15 is a view showing the outer look of a hand-held game apparatus according to still another embodiment of the present invention (using a single liquid crystal display device to realize liquid crystal display sections embodying two screens, which are disposed side by side).

As a further alternative to employing two physically separate LCDs 11 and 12 which are disposed one on top of the other, a structure as shown in FIG. 14 may be adopted, which employs only one LCD. The LCD shown in FIG. 14 has the same horizontal dimension as that of the above-described LCDs 11 and 12, but has a vertical dimension which is twice as long as its horizontal dimension, so as to be capable of displaying two screens on one top of the other. Thus, the physically single LCD can provide liquid crystal display sections embodying two screens, on which two map images can be displayed on one top of the other, without any physical separation between the upper and lower screens. Similarly, as shown in FIG. 15, an LCD may be employed which has the same vertical dimension as that of the above-described LCDs 11 and 12, but has a horizontal dimension which is twice as long as its vertical dimension. Such an LCD is capable of displaying two map images side by side along the lateral direction, without any physical separation between the right and left screens.

Although the above embodiments illustrate examples where the touch panel 16 is mounted on only one screen, i.e., the LCD 12, it will be appreciated that the touch panel 16 may be mounted on both liquid crystal display sections (LCDs 11 and 12), so as to provide two screens which are equipped with the touch panel 16.

While the invention has been described in detail, the foregoing description is in all aspects illustrative and not restrictive. It is understood that numerous other modifications and variations can be devised without departing from the scope of the invention.

What is claimed is:

1. A game system comprising:
a first display area;
a second display area;
a storage device storing program instructions;
at least one processor coupled to the storage device, the at least one processor executing said program instructions to provide a game image generation section which generate plural game images representing a game map, the plural game images including a broad-range game image representing a relatively broad range in the game map and a narrow-range game image representing a relatively narrow range in the game map, the broad-range and narrow-range game images each showing the game map viewed from a common direction;
display control section coupled to the processor, the display control section being configured to display the broad-range game image on the first display area and to display the narrow-range game image on the second display area;
a coordinate detection section which detects coordinates on the first display area, the second display area or both; and
a manipulation detection section coupled to the coordinate detection section, the manipulation detection section detecting either one or both of a moving amount and a moving direction of the coordinates;
wherein the processor executes said program instructions to further provide an image control section which controls at least one of the broad-range game image or the narrow-range game image based on said either one or both of the moving amount and the moving direction.

2. The game system according to claim 1, wherein,
the coordinate detection section detects the coordinates on the first display area displaying the broad-range game image,
the manipulation detection section further detects, based on the coordinates detected by the coordinate detection section, coordinates designated by a user, and
the game image generation section, when the manipulation detection section has detected the designated coordinates, calculates a position on the broad-range game image based on the coordinates detected by the coordinate detection section and changes the narrow-range game image generated by the game image generation section so as to be the narrow-range game image around the position on the broad-range game image.

3. The game system according to claim 2, wherein,
the game image generation section changes, in accordance with the calculated position on the broad-range game image, the narrow-range game image generated by the game image generation section, and changes, in accordance with the moving direction detected by the manipulation detection section on the broad-range game image, the broad-range game image so as to scroll the broad-range game image, and
the changed narrow-range game image and the changed broad-range game image are combined with player object images of which sizes have been adjusted based on scales of the narrow-range game image and the broad-range game image, respectively.

4. The game system according to claim 1, wherein,
the manipulation detection section detects at least the moving direction, and
the game image generation section, when the manipulation detection section has detected the moving direction, changes, in accordance with the moving direction, the broad-range game image so as to be the broad-range game image having been moved in the moving direction.

5. The game system according to claim 1, wherein,
the coordinate detection section detects the coordinates on the first display area displaying the broad-range game image,
the manipulation detection section detects the moving direction and further detects, based on the coordinates detected by the coordinate detection section, coordinates designated by a user, and
the game image generation section:
when the manipulation detection section has detected the designated coordinates, calculates a position on the broad-range game image based on the coordinates detected by the coordinate detection section and changes the narrow-range game image generated by the game image generation section so as to be the narrow-range game image around the position on the broad-range game image; and
changes, in accordance with the moving direction detected by the manipulation detection section, the broad-range game image generated by the game image generation section so as to be the broad-range game image having been moved in the moving direction.

6. A game system comprising:
a first display area and a second display area;
a storing device that stores program instructions;
a computer processor coupled to the storage device, the computer processor executing the stored program instructions to provide a game image generation section which generates game images representing a game map viewed from a direction, the generated game images including a broad-range game image representing a relatively broad range in the game map viewed from the direction and a narrow-range game image representing a relatively narrow range in the game map viewed from the direction;
a display control section which displays the broad-range game image on the first display area and displays the narrow-range game image on the second display area;
a coordinate detection section which detects coordinates on at least either one of the first display area or the second display area;
a manipulation detection section which detects either one or both of a moving amount and a moving direction of the coordinates; from the coordinates; and
an image control section which controls at least either one of the broad-range game image or the narrow-range game image based on said either one or both of the moving amount and the moving direction to thereby control the first display area to display as a first game picture the broad-range game image data and controls the second display area to display as a second game picture the narrow-range game image.

7. The game system according to claim 6, wherein,
the manipulation detection section further detects that a predetermined click operation has been performed on the coordinate detection section, and generates data designating a display area for the narrow-range game image which is centered around a position on the narrow-range image that corresponds to coordinates at which the detected click operation has been performed, and the game image generation section changes, in accordance with the data designating the display area, the narrow-range game image so as to represent the narrow-range game image around the position.

8. The game system according to claim 6, wherein, the manipulation detection section detects at least the moving direction and the game image generation section, when the manipulation detection section has detected the moving direction, changes, in accordance with the moving direction, the broad-range game image so as to be the broad-range game image having been moved in the moving direction.

9. The game system according to claim 8, wherein, the coordinate detection section detects the coordinates on the first display area displaying the broad-range game image, the manipulation detection section detects the moving direction and further detects, based on the coordinates detected by the coordinate detection section, coordinates designated by a user, and the game image generation section has detected the designated coordinates, calculates a position on the broad-range game image based on the coordinates detected by the coordinate detection section and changes the narrow-range game image generated by the game image generation section so as to be the narrow-range game image around the position on the broad-range game image; and changes, in accordance with the moving direction detected by the manipulation detection section, the broad-range game image generated by the game image generation section so as to be the broad-range game image having been moved in the moving direction.

10. The game system according to claim 6, wherein, the game image generation section changes, in accordance with a calculated position on the broad-range game image, the narrow-range game image generated by the game image generation section and changes, in accordance with the moving direction detection by the manipulation detection section on the broad-range game image, the broad-range game image so as to scroll the broad-range game image; and the changed narrow-range game image and the changed broad-range game image are combined with player object images of which sizes have been adjusted based on scales of the narrow-range game image and the broad-range game image, respectively.

11. A non-transitory storage medium storing a game program for use with a game system comprising a first display area and a second display area;

the game program comprising instructions causing a computer to perform:

generating game images representing a game map viewed from a direction, the generated game images comprising a broad-range game image representing a relatively broad range in the game map viewed from the direction and a narrow-range game image representing a relatively narrow range in the game map viewed from the direction;

displaying the broad-range game image on the first display area;

displaying the narrow-range game image on the second display area;

detecting coordinates on at least either one of the first display area or the second display area;

detecting either one or both of a moving amount and a moving direction of the coordinates from the coordinates, and controlling at least one of the broad-range map or the narrow-range map based on said either one or both of the moving amount and the moving direction.

12. The non-transitory storage medium storing the game program according to claim 11, wherein, the detecting includes detecting the coordinates on the first display area displaying the broad-range game image, and detecting, based on the detected coordinates, coordinates designated by a user, and when the designated coordinates have been detected, calculating a position on the broad-range game image based on the coordinates detected, and changing the narrow-range game image so as to be the narrow-range game image around the position on the broad-range game image.

13. The non-transitory storage medium storing the game program according to claim 11, wherein, the second-recited detecting includes detecting at least the moving direction, and the imaging generating includes changing, when moving direction has been detected, changes, in accordance with the moving direction, the broad-range game image so as to be the broad-range game image having been moved in the moving direction.

14. The non-transitory storage medium storing the game program according to claim 11, wherein, the detecting includes detecting the coordinates on the first display area displaying the broad-range game image and detecting the moving direction and further detecting, based on the coordinates detected, coordinates designated by a user, and when the designated coordinates have been detected, calculating a position on the broad-range game image based on the detected coordinates and changing the narrow-range game image so as to be the narrow-range game image around the position on the broad-range game image, and changing, in accordance with the moving direction detected by the manipulation detection, the broad-range game image generated by the map image generation so as to be the broad-range map image having been moved in the moving direction.

15. A non-transitory storage medium storing a game program for use with a game system comprising a first display area and a second display area, the game program comprising instructions causing a computer to perform:

generating game images representing a game map viewed from the a direction, the generated game images comprising a broad-range game image representing a relatively broad range in the game map viewed from the direction and a narrow-range game image representing a relatively narrow range in the-game map viewed from the direction;

displaying the broad-range game image on the first display area and displaying the narrow-range game image on the second display area;

detecting coordinates on at least either one of the first display area and the second display area;

manipulation detection which at least detects either one or both of a moving amount and a moving direction of the coordinates from the coordinates; and controlling at least either one of the broad-range game image or the narrow-range game image based on either one or both of the moving amount and the moving direction.

16. The non-transitory storage medium storing the game program according to claim 15, wherein,
while the broad-range game image is being displayed by the second display area, the manipulation detection generates data from the image, designating a displayed area for the narrow-range game image which is centered around a designated coordinate position, based on a predetermined click operation on a touch panel, and
further including imparting changes, in accordance with the data designating the displayed area as detected by the manipulation detection, the narrow-range map image data so as to be the narrow-range map image around the designated coordinate position.

17. The non-transitory storage medium storing the game program according to claim 15, wherein,
the manipulation detection detects at least the moving direction, and
the game image changes, when the moving direction has been detected, in accordance with the moving direction as detected by the manipulation detection, the broad-range game image so as to be the broad-range game image having been moved in the moving direction.

18. The non-transitory storage medium storing the game program according to claim 15, wherein,
the coordinate detection detects the coordinates on the first display area displaying the broad-range game image,
the manipulation detection detects the moving direction and further detects, based on the coordinates detected by the coordinate detection, coordinates designated by a user, and
the game image generation, when the manipulation detection has detected the designated coordinates, calculates a position on the broad-range game image based on the coordinates detected by the coordinate detection and changes the narrow-range game image generated by the game image generation so as to be the narrow-range game image around the position on the broad-range game image; and
changes, in accordance with the moving direction detected by the manipulation detection, the broad-range game image generated by the game image generation so as to be the broad-range game image having been moved in the moving direction.

19. A method of selectively displaying game information, comprising:
(a) displaying a first range of game images in a first display area;
(b) displaying a second range of game images in a second display area, said second range of game images being a smaller subset of the first range of game images, said first and second ranges of game images representing the game map viewed from a common direction;
(c) sensing touch input coordinates to at least one of the first display area and the second display area to designate at least a moving direction and a moving amount of the coordinates; and
(d) using at least one computer processor to selectively control the display of at least one of the first display area and the second display area based on at least one of the moving amount and the moving direction.

20. The method of claim 19, wherein the displaying (a) further comprises displaying a first range of game information in the first display area provided by a first display, wherein the first display is provided separate from and in close proximity to the second display area.

21. The method of claim 19, wherein the displaying (a) further comprises displaying a first range of game information on a first display area comprising a portion of a display on which the second display area is also defined.

22. The method of claim 19, wherein the selectively controlling (d) comprises shifting the displayed second range of game information in a direction, based at least in part on the input, to display a new second range of game information.

23. A system for displaying a game map comprising:
a user coordinate input detector;
a manipulation processor coupled to the user coordinate input detector, the manipulation processor detecting either one or both of a moving amount and a moving direction of detected user coordinate input; and
a game image generator coupled to the manipulation processor, the game image generator generating first and second images of the game map for concurrent display, the first image depicting a portion of the game map covering a first range, the second image depicting a portion of the game map covering a second range, the second range being narrower than the first range, the first and second images depicting respective game map portions from the same viewing direction, the game image generator controlling at least one of the first and second images based on the detected either one or both of the moving amount and the moving direction.

24. The system of claim 23 wherein the second image shows a subset of the game map portion the first image depicts.

25. The system of claim 23 further including first and second displays coupled to the image generator, the first display displaying the first image, the second display concurrently displaying the second image, at least one of the first and second displays comprising a touch screen, the touch screen providing the user coordinate input detector.

26. The system of claim 23 further including first and second display areas coupled to the image generator, the first display area displaying the first image, the second display area displaying the second image, at least one of the first and second display areas being touch sensitive.

* * * * *